United States Patent
Hua et al.

(10) Patent No.: US 11,956,880 B2
(45) Date of Patent: Apr. 9, 2024

(54) CABLE ARRANGEMENT FOR HEATING SYSTEM

(71) Applicant: NXP USA, Inc., Austin, TX (US)

(72) Inventors: Qi Hua, Wu Xi (CN); Changyang Wang, Shanghai (CN); Tonghe Liu, Pudong New District (CN)

(73) Assignee: NXP USA, INC., Austin, TX (US)

( * ) Notice: Subject to any disclaimer, the term of this patent is extended or adjusted under 35 U.S.C. 154(b) by 545 days.

(21) Appl. No.: 17/110,690

(22) Filed: Dec. 3, 2020

(65) Prior Publication Data

US 2022/0086965 A1 Mar. 17, 2022

(30) Foreign Application Priority Data

Sep. 17, 2020 (CN) .......................... 202010979374.8

(51) Int. Cl.
*H05B 6/50* (2006.01)
*H05B 6/62* (2006.01)
*H05B 6/52* (2006.01)

(52) U.S. Cl.
CPC .............. *H05B 6/50* (2013.01); *H05B 6/52* (2013.01)

(58) Field of Classification Search
CPC .. G01N 2291/02408; G01N 2291/0255; G01N 2291/0256; G01N 2291/0426; G01N 29/022; G01N 29/036; G01N 29/2443; G01N 29/46; H03H 9/125; H03H 9/19; H05B 6/50; H05B 6/52; H05B 6/62; Y02B 40/00
USPC ....... 219/690, 694, 695, 696, 697, 702, 704, 219/709, 715, 716, 746, 748, 750, 761, 219/764, 770, 771, 778, 779, 780
See application file for complete search history.

(56) References Cited

U.S. PATENT DOCUMENTS

| | | |
|---|---|---|
| 5,541,482 A | 7/1996 | Siao |
| 5,777,769 A | 7/1998 | Coutinho |
| 8,491,759 B2 | 7/2013 | Pipitone et al. |
| 9,882,538 B2 | 1/2018 | Poulin et al. |
| 9,923,530 B2 | 3/2018 | Kao et al. |
| 10,270,402 B1 | 4/2019 | Holmes et al. |
| 10,763,814 B2 | 9/2020 | Brounley et al. |
| 11,039,511 B2 | 6/2021 | Scott et al. |

(Continued)

FOREIGN PATENT DOCUMENTS

| | | |
|---|---|---|
| CN | 102545354 A | 7/2012 |
| CN | 206062927 U | 4/2017 |

(Continued)

*Primary Examiner* — Quang T Van

(57) ABSTRACT

A system includes an RF signal source configured to output an RF signal at a first frequency, and a first controller configured to generate a first data signal encoding instructions at a second frequency. A first filter is coupled to the RF signal source. The first filter is a low pass filter having a cutoff frequency between the first frequency and the second frequency. The first filter is configured to couple to a first end of a cable. A second filter is coupled to the first controller. The second filter is a high pass filter having a cutoff frequency between the first frequency and the second frequency. The second filter is configured to couple to the first end of the cable. The system includes an impedance matching network configured to couple to a second end of the cable. A first electrode is coupled to the impedance matching network.

15 Claims, 9 Drawing Sheets

(56) References Cited

U.S. PATENT DOCUMENTS

| | | |
|---|---|---|
| 11,166,352 B2 | 11/2021 | Scott et al. |
| 11,336,253 B2 | 5/2022 | Arigong et al. |
| 2007/0252728 A1* | 11/2007 | Wisherd ................ G07B 15/02 705/13 |
| 2010/0321110 A1 | 12/2010 | Ichitsubo et al. |
| 2018/0042074 A1 | 2/2018 | Qiu et al. |
| 2018/0220499 A1 | 8/2018 | Sims et al. |
| 2019/0306933 A1 | 10/2019 | McCarville et al. |
| 2020/0092957 A1 | 3/2020 | Ma et al. |
| 2020/0205245 A1 | 6/2020 | Ma et al. |
| 2022/0086965 A1 | 3/2022 | Hua et al. |

FOREIGN PATENT DOCUMENTS

| | | | |
|---|---|---|---|
| CN | 110996422 U | 4/2020 | |
| EP | 3280225 A1 | 2/2018 | |
| EP | 3672367 A1 * | 6/2020 | .............. A23B 4/07 |
| FR | 2937199 A1 | 4/2010 | |
| GB | 2308791 A * | 7/1997 | .............. H04B 3/56 |
| GB | 2454236 A | 9/2009 | |

\* cited by examiner

CABLE ARRANGEMENT FOR HEATING SYSTEM

CROSS-REFERENCE TO RELATED APPLICATIONS

This application claims the priority under 35 U.S.C. § 119 of China patent application no. 202010979374.8, filed Sep. 17, 2020, the contents of which are incorporated by reference herein.

TECHNICAL FIELD

Embodiments of the subject matter described herein relate generally to an apparatus for and methods of operating a heating appliance that uses electromagnetic energy to warm or heat a load contained within a cavity.

BACKGROUND

Capacitive heating systems include planar electrodes contained within a heating compartment. After a load (e.g., a food load) is placed between the electrodes, electromagnetic energy is supplied to the electrodes to provide warming or cooking of the load.

A heating appliance may include a power amplifier module (PAM) and a smart tuning unit (STU). The PAM supplies the RF energy used to effect heating to the STU. The STU includes an impedance matching circuit that is configured to provide efficient delivery of the RF energy to the appliance's heating cavity. The PAM also supplies control signals to the STU to effect tuning of the STU's impedance matching circuitry. In conventional systems, the RF energy and the control signals are communicated via separate electrical cables connected between the PAM and the STU.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
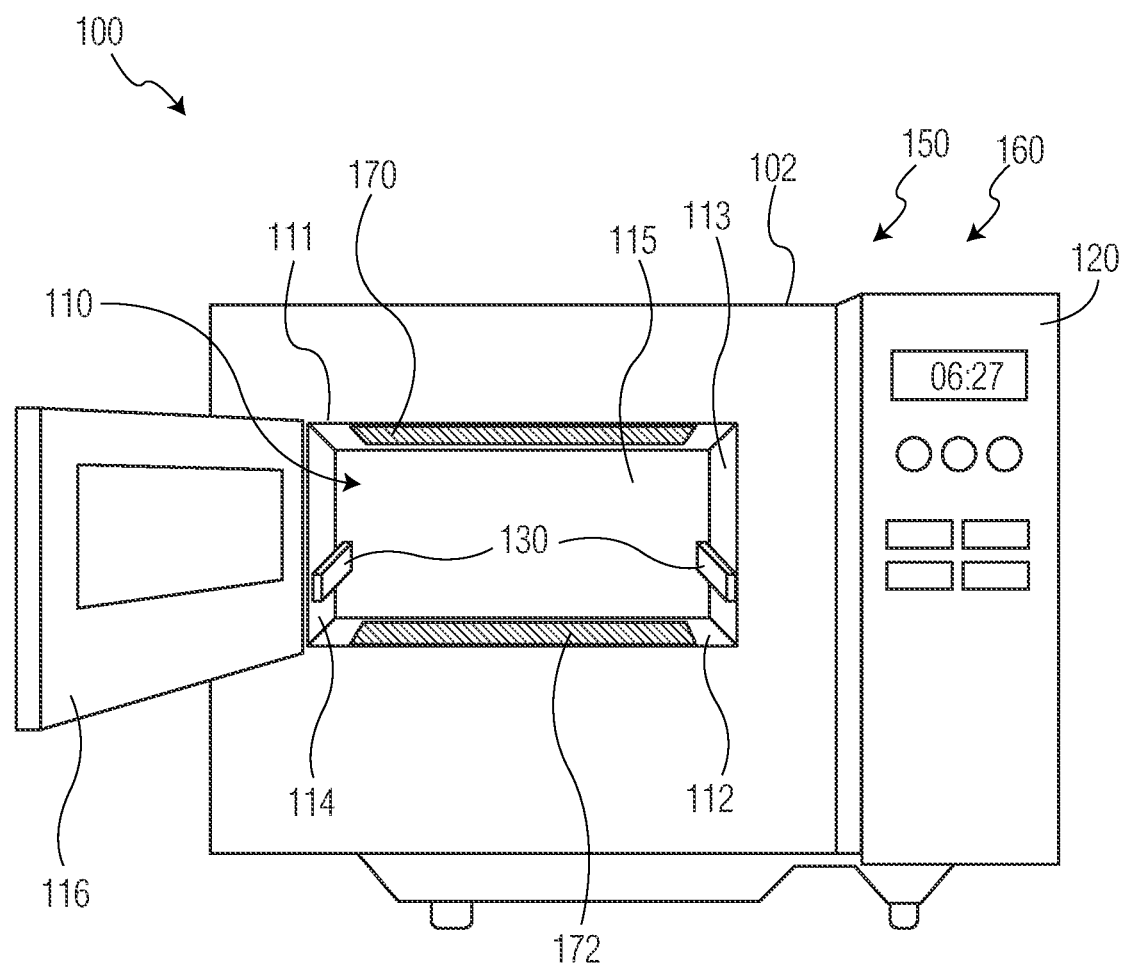
FIG. 1 is a perspective view of a heating appliance with a radio frequency (RF) heating system, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to appliances or heating systems configured to heat or cook a load (e.g., a food load or another type of load) using radio frequency (RF) energy. In an embodiment, the appliances, as described herein, may be utilized to heat frozen loads to effect a defrosting operation. Example heating appliances, apparatus, and/or systems may include one or more heating systems that can operate simultaneously in order to heat a load within a heating cavity.

The heating appliance or system may be implemented as a defrosting system that uses relatively low-frequency RF energy to fully or partially defrost frozen loads. The appliance includes a heating cavity into which the load may be placed. Once the heating process is initiated, the appliance applies RF energy to the load via one or more electrodes disposed within the heating cavity. The RF energy can be relatively high-magnitude and low-frequency RF energy configured to warm or heat the load. In an embodiment, the RF energy is generated using a solid-state low frequency (1 MHz-300 MHz) RF energy source, as described herein.

In an embodiment, the appliance may include only an RF heating system without other heating systems. Such an RF heating system includes a solid-state RF signal source, a variable impedance matching network, and two electrodes, where the two electrodes are separated by the heating cavity. More specifically, the RF heating system may be implemented as a "capacitive" heating system, in that the two electrodes function as electrodes (or plates) of a capacitor, and the capacitor dielectric essentially includes the portion of the cavity between the two electrodes and any load contained therein.

In other embodiments, the appliance may optionally include multiple heating systems that include an RF heating system and a "thermal" heating system. The thermal heating system can include any one or more systems that heat the air within the cavity, such as one or more resistive heating elements.

Embodiments of the RF heating system, which is included in the heating appliance along with the optional thermal heating system, differ from a conventional microwave oven system in several respects. For example, embodiments of the RF heating system include a solid-state RF signal source, as opposed to a magnetron that is utilized in a conventional microwave oven system. Utilization of a solid-state RF signal source may be advantageous over a magnetron, in that a solid-state RF signal source may be significantly lighter and smaller, and may be less likely to exhibit performance degradation (e.g., power output loss) over time.

In addition, embodiments of the RF heating system may generate electromagnetic energy in the heating cavity at frequencies that are significantly lower than the 2.45 gigahertz (GHz) frequency that is typically used in conventional microwave oven systems. In some embodiments, for example, the heating system generates electromagnetic energy in the heating cavity at frequencies within the VHF (very high frequency) range (e.g., from 30 megahertz (MHz) to 300 MHz). The significantly lower frequencies utilized in the various embodiments may result in deeper energy penetration into the load, and thus potentially faster and more even warming or heating of the load. Further still, embodiments of the RF heating system can include a single-ended or double-ended variable impedance matching network, which is dynamically controlled based on the magnitude of reflected RF power from the appliance's heating cavity. This dynamic control enables the system to provide a good match between the RF signal generator and the system heating cavity (plus load) throughout a heating process, which may result in increased system efficiency and reduced heating time (e.g., reducing the time required to defrost or cook a food load).

In various implementations, impedance matching networks incorporated into the heating appliance may have a relatively large number of potential impedance states. That is, the impedance matching networks can exhibit a large number of different impedance transformations between an input to the impedance matching network and the network's output. The different impedance states may be selected, for example, by supplying the impedance matching network with different control inputs (e.g., supplied by a system controller), which are selected to configure the state of one or more internal components of the impedance matching network. With the states of those internal components so configured, the impedance transformation performed by the impedance matching network can be controlled.

In the appliance, the impedance transformation performed by the impedance matching network may be configured to provide optimum RF power delivery into the load being heated within the heating cavity. This generally involves selecting a configuration for the impedance matching network that minimizes or reduces and amount of reflected energy from the heating cavity of the heating system. By reducing an amount of reflected energy from the heating cavity, this approach can maximize or increase an amount of RF energy that is being delivered into a load positioned within the heating cavity. By providing such optimized RF power delivery into the load, the load can be heated more efficiently and more quickly.

Some variable impedance matching network embodiments may be configurable into a large number of states, each state exhibiting a different impedance value or providing a different magnitude of impedance transformation between an input and an output to the variable impedance matching network. Some networks, for example, may have thousands (e.g., 2,048 or some other number) of possible impedance matching states, each exhibiting a different magnitude of impedance transformation between the input and output of the network.

In still other embodiments, impedance matching between the RF signal source and the heating cavity of the appliance may be achieved by the appliance varying the frequency of the RF signal being generated by the appliance's RF heating system. In various embodiments, the appliance may use both frequency adjustments in combination with variable impedance matching networks to achieve optimized impedance matching between the appliance's RF heating system and the appliance's heating cavity.

Generally, the term "heating" means to elevate the temperature of a load (e.g., a food load or other type of load). As used herein, the term "heating" more broadly means a process by which the thermal energy or temperature of a load is increased through provision of thermal radiation of air particles and/or RF electromagnetic energy applied to the load. The term "defrosting" means to elevate the temperature of a frozen load (e.g., a food load or other type of load) to a temperature at which the load is no longer frozen (e.g., a temperature at or near 0 degrees Celsius). As used herein, the term "defrosting" more broadly means a process by which the thermal energy or temperature of a load is increased through provision of radio frequency (RF) power to the load. Accordingly, in various embodiments, a "heating operation" may be performed on a load with any initial temperature, including loads that are frozen, and the heating operation may be ceased at any final temperature that is higher than the initial temperature, where the final temperature may correspond to a tempered state for the load at or near 0 degrees Celsius for a frozen load (e.g., a temperature of about −1 or −2 degrees Celsius), or the temperature may be higher than 0 degrees Celsius. That said, the "heating operations" and "heating systems" described herein (which may alternatively be referred to as "defrosting operations" and "defrosting systems") alternatively may be referred to as "thermal increase operations" and "thermal increase systems." The term "cooking" refers to the process of heating a food load.

FIG. 1 is a perspective view of a heating system 100 (e.g., a defrosting system or appliance), in accordance with an example embodiment. Heating system 100 includes a heating cavity 110 (e.g., cavity 260, 1260, FIGS. 2A, 2B), a control panel 120, an RF heating system 150 (e.g., RF heating system 210, 1210, FIGS. 2A, 2B), and an optional thermal heating system 160 (e.g., thermal heating system 250, 1250, FIG. 2A, 2B), all of which are secured within a system housing 102. The heating cavity 110 is defined by interior surfaces of top, bottom, side, and back cavity walls 111, 112, 113, 114, 115. An optional door 116 may be positioned over heating cavity 110 and retained by a latching mechanism to fully enclose the heating cavity 110.

In some embodiments, one or more retention structures 130 are accessible within the heating cavity 110. When a food load or a food load container is positioned within heating cavity 110, retention structures 130 may be configured to engage with a shelf or with mating structures formed in an exterior surface of the food load container to retain the food load container within the heating cavity 110 in a particular position (e.g., a particular distance away from one or more of electrodes 170 and 172) and orientation with respect to the heating cavity 110. In such an embodiment, the container may include a material that is generally permeable (i.e., transparent) to the RF energy transmitted into the heating cavity 110 by the heating system 100 so that the container does not absorb the RF energy and it is instead transmitted into the food load contained within the container. In various embodiments, such a container may include any suitable materials (e.g., microwave-safe materials), such as polypropylenes, polymethylpentene, polysulfone, Polytetrafluoroethylene (PTFE), or combinations thereof. In various other embodiments of the heating system 100, however, a load may be placed directly into the heating cavity 110 and may not be placed on a shelf or contained in a container or other structure that would contain the load. In other words, loads may be heated with the heating system 100 with or without a container.

Figure 2A:
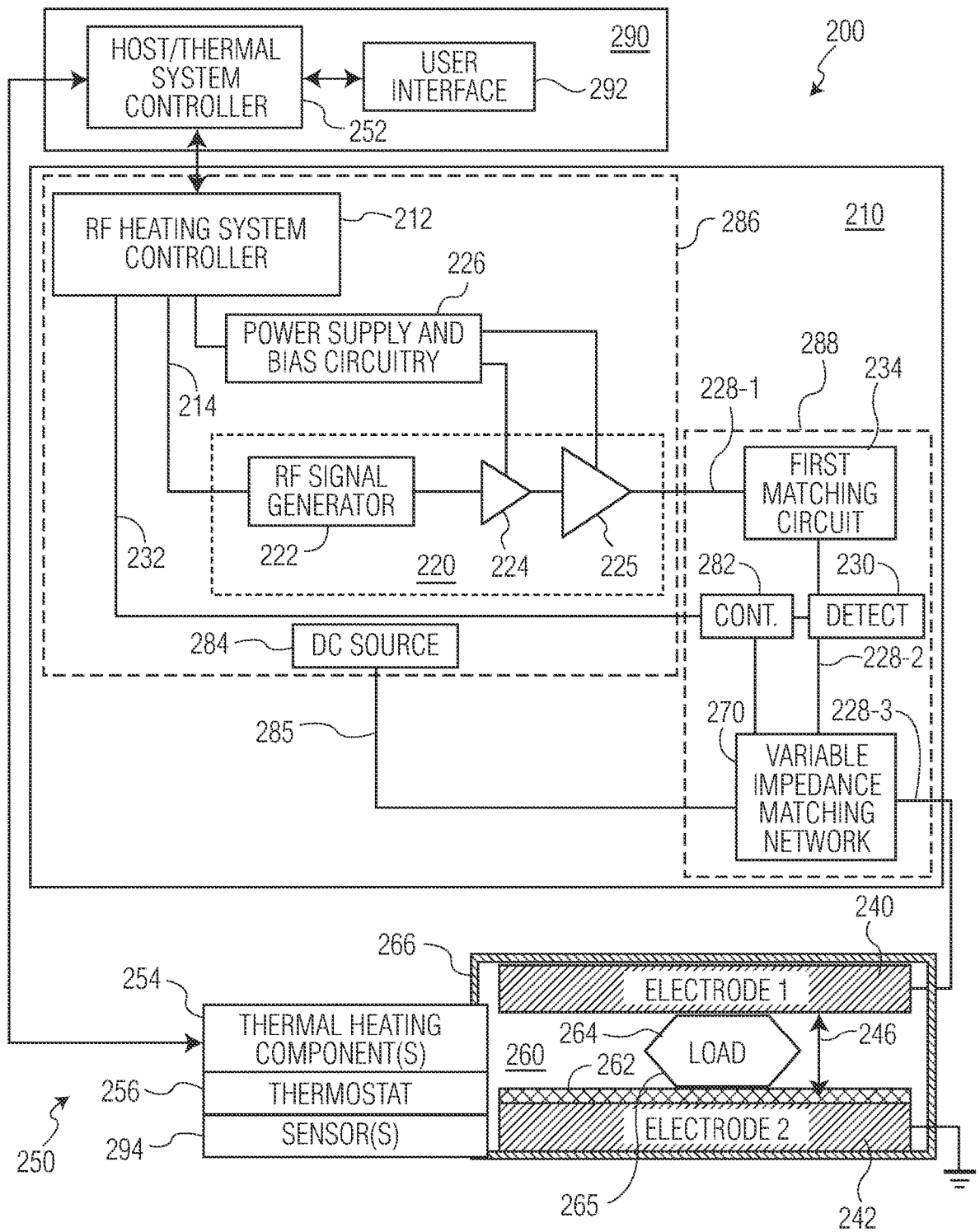
FIG. 2A is a simplified block diagram of a heating apparatus with an RF heating system, in accordance with an example embodiment.
Figure 2B:
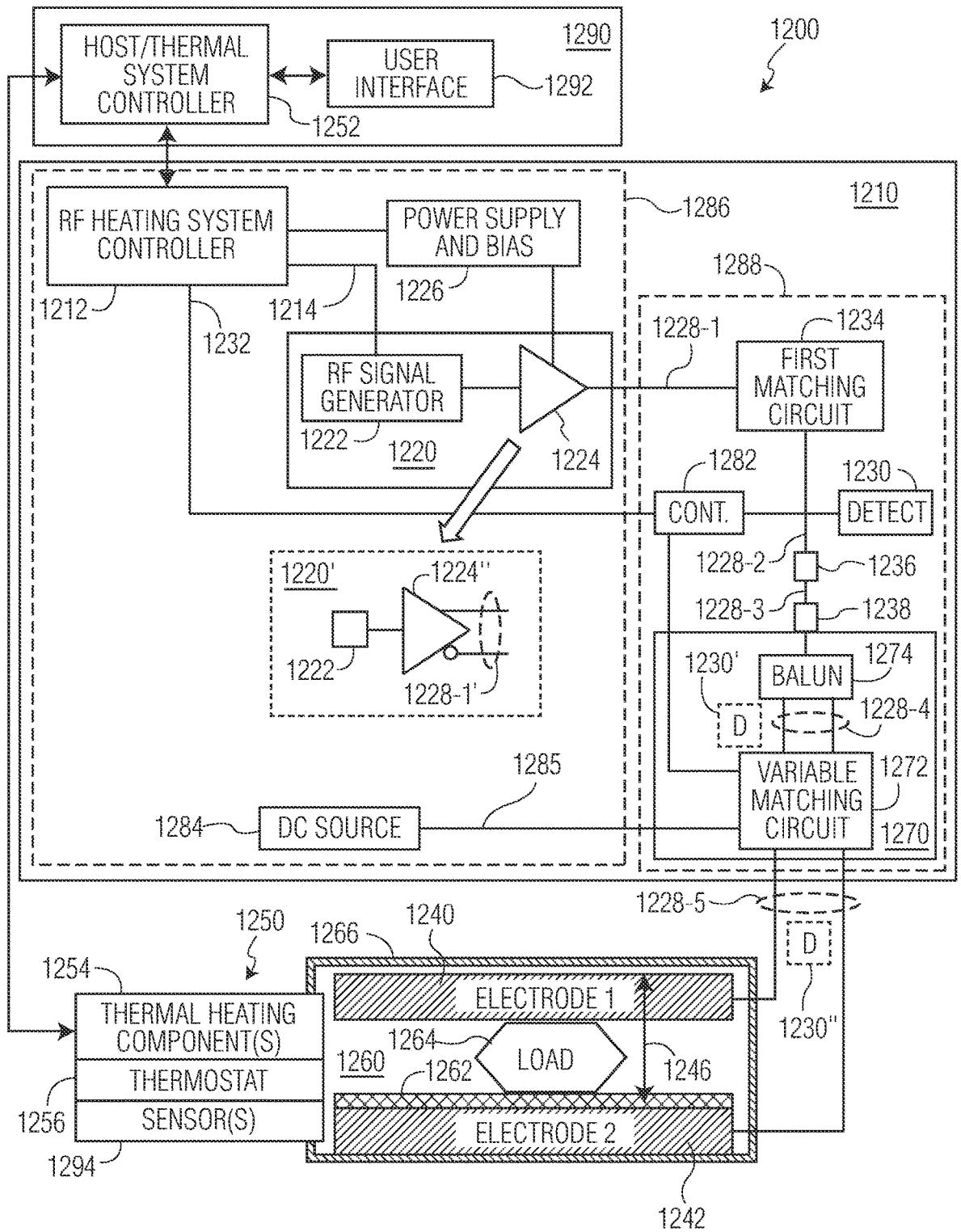
FIG. 2B is a simplified block diagram of a balanced heating apparatus with an RF heating system and a thermal heating system, in accordance with another example embodiment.

Heating system 100 includes an RF heating system 150 (e.g., RF heating system 210, 1210, FIGS. 2A, 2B). As shown in FIG. 1, the heating system 100 may optionally include a thermal heating system 160, which heats the air in heating cavity 110 and may include any of resistive heating elements, a convection blower, a convection fan plus a resistive heating element, a gas heating system, or other heating elements.

As will be described in greater detail below, the RF heating system 150 includes one or more radio frequency (RF) signal sources (e.g., RF signal source 220, 1220, FIGS. 2A, 2B), a power supply (e.g., power supply 226, 1226, FIGS. 2A, 2B), a first electrode 170 (e.g., electrode 240, 1240, FIGS. 2A, 2B), a second electrode 172 (e.g., electrode 242, 1242, FIGS. 2A, 2B), impedance matching circuitry (e.g., network 270, 1234, 1270, FIGS. 2A, 2B), power detection circuitry (e.g., power detection circuitry 230, 1230, FIGS. 2A, 2B), and an RF heating system controller (e.g., system controller 212, 1212, FIGS. 2A, 2B).

The first electrode 170 is arranged proximate to a cavity wall (e.g., top wall 111), and the second electrode 172 is arranged proximate to an opposite, second cavity wall (e.g., bottom wall 112). Alternatively, as indicated above, the second electrode 172 may be replaced by a removable shelf structure or an electrode within such a shelf structure. Either way, the first and second electrodes 170, 172 are electrically isolated from the remaining cavity walls (e.g., walls 113-115 and door 116), and the remaining cavity walls may be grounded. In either configuration, the system may be simplistically modeled as a capacitor, where the first electrode 170 functions as one conductive plate (or electrode), the second electrode 172 functions as a second conductive plate (or electrode), and the air cavity between the electrodes 170, 172 (including any load contained therein) functions as a dielectric medium between the first and second conductive plates.

The RF heating system 150 may be an "unbalanced" RF heating system or a "balanced" RF heating system, in various embodiments. As will be described in more detail later in conjunction with FIG. 2A, when configured as an "unbalanced" RF heating system, the system 150 includes a single-ended amplifier arrangement (e.g., amplifier arrangement 220, FIG. 2A), and a single-ended impedance matching network (e.g., including networks 234, 270, FIG. 2A) coupled between an output of the amplifier arrangement and the first electrode 170, and the second electrode 172 is grounded. Although alternatively the first electrode 170 could be grounded, and the second electrode 172 could be coupled to the amplifier arrangement. In contrast, when configured as a "balanced" RF heating system, as will be described in more detail later in conjunction with FIG. 2B, the system 150 includes a single-ended or double-ended amplifier arrangement, and a double-ended impedance matching network coupled between an output of the amplifier arrangement and the first and second electrodes 170, 172. In either the balanced or unbalanced embodiments, the impedance matching network includes a variable impedance matching network that can be adjusted during the heating operation to improve matching between the amplifier arrangement and the cavity (plus load). Further, a measurement and control system can detect certain conditions related to the heating operation (e.g., an empty system cavity, a poor impedance match, and/or completion of a heating operation).

The thermal heating system 160 includes a thermal system controller (e.g., thermal system controller 252, 1252, FIGS. 2A, 2B), a power supply, a heating element or component, and a thermostat, in an embodiment. The heating element may be, for example, a resistive heating element, which is configured to heat air surrounding the heating element when current from the power supply is passed through the heating element. In such an embodiment, the resistive heating element could be positioned to be in physical contact with a food load container when the container is positioned within the heating cavity of the heating system 160.

Referring again to FIG. 1, and according to an embodiment, during operation of the heating system 100, a user (not illustrated) may first place one or more loads or load containers into the heating cavity 110. As described previously, such a load container may engage with one or more retention structures 130 within the heating cavity 110 to retain the container with in the heating cavity 110 in a particular location and orientation with respect to the heating cavity 110 and components thereof.

To initiate a heating process, the user may specify a type of heating mode that the user would like the system 100 to implement. The user may specify the heating mode through the control panel 120 (e.g., by pressing a button or making a cooking mode menu selection).

To begin the heating or defrosting operation, the user may provide a "start" input via the control panel 120 (e.g., the user may depress a "start" button). In response, a host system controller (e.g., host/thermal system controller 252, 1252, FIGS. 2A, 2B) sends appropriate control signals to the thermal heating system 160 and/or the RF heating system 150 throughout the cooking process, depending on which cooking mode is being implemented.

When performing RF-only heating or combined thermal and RF heating, the system selectively activates and controls the RF heating system 150 in a manner in which maximum RF power transfer may be absorbed by the load throughout the heating process. During the heating operation, the impedance of the load (and thus the total input impedance of the cavity 110 plus load) changes as the thermal energy of the load increases. The impedance changes alter the absorption of RF energy into the load, and thus alter the magnitude of reflected power. According to an embodiment, power detection circuitry (e.g., power detection circuitry 230, 1230, FIGS. 2A, 2B) continuously or periodically measures the reflected power along a transmission path between the RF signal source and the system electrode(s) 170 and/or 172. The power detection circuitry communicates its measurements to an RF heating system controller. Based on these measurements, the RF heating system controller (e.g., RF heating system controller 212, 1212, FIGS. 2A, 2B) may cause a controller (e.g., controllers 282, 1282, FIGS. 2A, 2B) to alter the state of the variable impedance matching network (e.g., networks 270, 1234, 1270, FIGS. 2A, 2B) during the heating operation to increase the absorption of RF power by the load. In addition, in some embodiments, the RF system controller may detect completion of the heating operation (e.g., when the load temperature has reached a target temperature) based on feedback from the power detection circuitry.

The heating system 100 of FIG. 1 is embodied as a counter-top type of appliance. Those of skill in the art would understand, based on the description herein, that embodiments of heating systems may be incorporated into systems or appliances having other configurations, as well. Accordingly, the above-described implementations of heating systems in a stand-alone appliance are not meant to limit use of the embodiments only to those types of systems. Instead, various embodiments of heating systems may be incorporated into wall-cavity installed appliances, and systems that include multiple types of appliances incorporated in a common housing. For example, the various components of the heating system of FIG. 1 could be incorporated into a refrigerator or a freezer (e.g., where the heating cavity is implemented as a drawer), or into another type of system.

Further, although heating system 100 is shown with its components in particular relative orientations with respect to one another, it should be understood that the various components may be oriented differently, as well. In addition, the physical configurations of the various components may be different. For example, control panel 120 may have more, fewer, or different user interface elements, and/or the user interface elements may be differently arranged. Further, although the electrodes 170, 172 are shown at the top and bottom cavity walls 111, 112, the electrodes 170, 172 may be located at opposed side walls, as well. In addition, although a substantially cubic heating cavity 110 is illustrated in FIG. 1, it should be understood that a heating cavity may have a different shape, in other embodiments (e.g., cylindrical, and so on). Further, heating system 100 may include additional components (e.g., a stationary or rotating plate within the cavity, an electrical cord, and so on) that are not specifically depicted in FIG. 1.

FIG. 2A is a simplified block diagram of an unbalanced heating system 200 (e.g., heating system 100 of FIG. 1), in accordance with an example embodiment. Heating system 200 includes host/thermal system controller 252, RF heating system 210, thermal heating system 250, user interface 292, and a containment structure 266 that defines a cavity 260, in an embodiment. It should be understood that FIG. 2A is a simplified representation of a heating system 200 for purposes of explanation and ease of description, and that practical embodiments may include other devices and components to provide additional functions and features, and/or the heating system 200 may be part of a larger electrical system.

The containment structure 266 may include bottom, top, and side walls, the interior surfaces of which define the cavity 260 (e.g., cavity 110, FIG. 1). According to an embodiment, the cavity 260 may be sealed (e.g., with a door) to contain the heat and electromagnetic energy that is introduced into the cavity 260 during a heating operation.

User interface 292 may correspond to a control panel (e.g., control panel 120, FIG. 1), for example, which enables a user to provide inputs to the system regarding parameters for a heating operation. In addition, the user interface may be configured to provide user-perceptible outputs indicating the status of a heating operation (e.g., a countdown timer, visible indicia indicating progress or completion of the heating operation, and/or audible tones indicating completion of the heating operation) and other information.

The thermal heating system 250 includes host/thermal system controller 252, one or more thermal heating components 254, and, in some embodiments, thermostat 256. In some embodiments, host/thermal system controller 252 and portions of user interface 292 may be included together in a host module 290.

Host/thermal system controller 252 is configured to receive signals indicating user inputs received via user interface 292, and to provide signals to the user interface 292 that enable the user interface 292 to produce user-perceptible outputs (e.g., via a display, speaker, and so on) indicating various aspects of the system operation. In addition, host/thermal system controller 252 sends control signals to other components of the thermal heating system 250 (e.g., to thermal heating components 254) to selectively activate, deactivate, and otherwise control those other components in accordance with desired system operation. The host/thermal system controller 252 also may receive signals from the thermal heating system components 254, thermostat 256, and sensors 294 (if included), indicating operational parameters of those components, and the host/thermal system controller 252 may modify operation of the system 200 accordingly, as will be described later. Further still, host/thermal system controller 252 receives signals from the RF heating system controller 212 regarding operation of the RF heating system 210. Responsive to the received signals and measurements from the user interface 292 and from the RF heating system controller 212, host/thermal system controller 252 may provide additional control signals to the RF heating system controller 212, which affect operation of the RF heating system 210.

The one or more thermal heating components 254 may include components that are configured to heat air within the cavity 260. The thermostat 256 is configured to sense the air temperature within the cavity 260, and to control operation of the one or more thermal heating components 254 to maintain the air temperature within the cavity at or near a temperature set point.

The RF heating system 210 includes RF heating system controller 212, RF signal source 220, power supply and bias circuitry 226, first impedance matching circuit 234 (herein "first matching circuit"), variable impedance matching network 270, first and second electrodes 240, 242, and power detection circuitry 230, in an embodiment. According to an embodiment, RF heating system controller 212 is coupled to host/thermal system controller 252, RF signal source 220, variable impedance matching network 270, power detection circuitry 230, and sensors 294 (if included). RF heating system controller 212 is configured to receive control signals from the host/thermal system controller 252 indicating various operational parameters, and to receive signals indicating RF signal reflected power (and possibly RF signal forward power) from power detection circuitry 230. Responsive to the received signals and measurements, RF heating system controller 212 provides control signals to the power supply and bias circuitry 226 and to the RF signal generator 222 of the RF signal source 220. In addition, RF heating system controller 212 provides control signals to controller 282, which is configured to cause the variable impedance matching network 270 to change its state or configuration. More specifically, controller 282 provides control signals that change the values of variable passive components (e.g., variable inductances and/or capacitances) within the variable impedance matching network 270 to change their values. For example, controller 282 may control various mechanical or electrical switches/relays within the variable impedance matching network 270 to switch passive components into and/or out of the variable impedance matching network 270, which affects the overall impedance transformation provided by the variable impedance matching network 270.

In embodiments, variable impedance matching network 270 may include components (e.g., relays and the like, as mentioned above) that require a DC power supply to operate. Accordingly, system 200 includes DC power source 284 configured to supply a DC power supply signal to variable matching circuit 270 via conductor 285.

Cavity 260 provides a capacitive heating arrangement with first and second parallel plate electrodes 240, 242 that are separated by an air cavity 260 within which an optional container 265 containing a load 264 to be heated or defrosted may be placed. For example, a first electrode 240 may be positioned above the cavity 260, and a second electrode 242 may be positioned below the cavity 260. In other embodiments, a distinct second electrode 242 may be excluded, and the functionality of the second electrode may be provided by a portion of the containment structure 266 (i.e., the containment structure 266 may be considered to be the second electrode, in such an embodiment). According to an embodiment, the containment structure 266 and/or the second electrode 242 may be connected to a ground reference voltage (i.e., containment structure 266 and second electrode 242 are grounded). The first and second electrodes 240, 242 are positioned within containment structure 266 to define a distance 246 between the electrodes 240, 242, where the distance 246 renders the cavity 260 a sub-resonant cavity, in an embodiment.

In general, an RF heating system 210 designed for lower operational frequencies (e.g., frequencies between 10 MHz and 1 GHz) may be designed to have a distance 246 that is a smaller fraction of one wavelength. For example, when system 210 is designed to produce an RF signal with an operational frequency of about 10 MHz (corresponding to a wavelength of about 30 meters), and distance 246 is selected to be about 0.5 meters, the distance 246 is about one 60th of one wavelength of the RF signal. Conversely, when system 210 is designed for an operational frequency of about 300 MHz (corresponding to a wavelength of about 1 meter), and distance 246 is selected to be about 0.5 meters, the distance 246 is about one half of one wavelength of the RF signal.

With the operational frequency and the distance 246 between electrodes 240, 242 being selected to define a sub-resonant interior cavity 260, the first and second electrodes 240, 242 are capacitively coupled. More specifically, the first electrode 240 may be analogized to a first plate of a capacitor, the second electrode 242 may be analogized to a second plate of a capacitor, and the load 264, barrier 262 (if included), and air within the cavity 260 may be analogized to a capacitor dielectric. Accordingly, the first electrode 240 alternatively may be referred to herein as an "anode," and the second electrode 242 may alternatively be referred to herein as a "cathode."

Essentially, the voltage across the first electrode 240 and the second electrode 242 contributes to heating the load 264 within the cavity 260. According to various embodiments, the RF heating system 210 is configured to generate the RF signal to produce voltages between the electrodes 240, 242 with peak values in a range of about 20 volts to about 3,000 volts, in one embodiment, or in a range of about 3,000 volts to about 10,000 volts, in another embodiment, although the system 210 may be configured to produce lower or higher voltages between the electrodes 240, 242, as well.

The first electrode 240 is electrically coupled to the RF signal source 220 through a first matching circuit 234, a variable impedance matching network 270, and a conductive transmission path, in an embodiment. The first matching circuit 234 is configured to perform an impedance transformation from an impedance of the RF signal source 220 (e.g., less than about 10 ohms) to an intermediate impedance (e.g., 50 ohms, 75 ohms, or some other value). According to an embodiment, the conductive transmission path includes a plurality of conductors 228-1, 228-2, and 228-3 connected in series, and referred to collectively as transmission path 228. According to an embodiment, the conductive transmission path 228 is an "unbalanced" path, which is configured to carry an unbalanced RF signal (i.e., a single RF signal referenced against ground). In some embodiments, one or more connectors (not shown, but each having male and female connector portions) may be electrically coupled along the transmission path 228, and the portion of the transmission path 228 between the connectors may comprise a coaxial cable or other suitable connector.

The variable impedance matching circuit 270 is configured to perform an impedance transformation from the above-mentioned intermediate impedance to an input impedance of cavity 260 as modified by the load 264 (e.g., on the order of hundreds or thousands of ohms, such as about 1000 ohms to about 4000 ohms or more). In an embodiment, the variable impedance matching network 270 includes a network of passive components (e.g., inductors, capacitors, resistors).

According to an embodiment, RF signal source 220 includes an RF signal generator 222 and a power amplifier (e.g., including one or more power amplifier stages 224, 225). In response to control signals provided by RF heating system controller 212 over connection 214, RF signal generator 222 is configured to produce an oscillating electrical signal having a frequency in the ISM (industrial, scientific, and medical) band, although the system could be modified to support operations in other frequency bands, as well. The RF signal generator 222 may be controlled to produce oscillating signals of different power levels and/or different frequencies, in various embodiments. For example, the RF signal generator 222 may produce a signal that oscillates in the VHF (very high frequency) range (i.e., in a range between about 30 MHz and about 300 MHz), and/or in a range of about 1 MHz to about 100 MHz, and/or from about 100 MHz to about 3.0 gigahertz (GHz). Some desirable frequencies may be, for example, 13.56 MHz (+/−5 percent), 27.125 MHz (+/−5 percent), 40.68 MHz (+/−5 percent), and 915 MHz (+/−5 percent). In one particular embodiment, for example, the RF signal generator 222 may produce a signal that oscillates in a range of about 40.66 MHz to about 40.70 MHz and at a power level in a range of about 10 decibel-milliwatts (dBm) to about 15 dBm. Alternatively, the frequency of oscillation and/or the power level may be lower or higher.

In the embodiment of FIG. 2A, the power amplifier includes a driver amplifier stage 224 and a final amplifier stage 225. The power amplifier is configured to receive the oscillating signal from the RF signal generator 222, and to amplify the signal to produce a significantly higher-power signal at an output of the power amplifier. For example, the output signal may have a power level in a range of about 100 watts (W) to about 400 W or more. The gain applied by the power amplifier may be controlled using gate bias voltages and/or drain bias voltages provided by the power supply and bias circuitry 226 to each amplifier stage 224, 225. More specifically, power supply and bias circuitry 226 provides bias and supply voltages to each RF amplifier stage 224, 225 in accordance with control signals received from RF heating system controller 212.

In FIG. 2A, the power amplifier arrangement is depicted to include two amplifier stages 224, 225 coupled in a particular manner to other circuit components. In other embodiments, the power amplifier arrangement may include other amplifier topologies and/or the amplifier arrangement may include only one amplifier stage, or more than two amplifier stages. For example, the power amplifier arrangement may include various embodiments of a single-ended amplifier, a Doherty amplifier, a Switch Mode Power Amplifier (SMPA), or another type of amplifier.

Cavity 260 and any load 264 (e.g., food, liquids, and so on) positioned in the cavity 260 in combination with container 265 present a cumulative load for the electromagnetic energy (or RF power) that is radiated into the cavity 260 by the first electrode 240. More specifically, the cavity 260 and the container 265 and load 264 present an impedance to the system, referred to herein as a "cavity plus load impedance." The cavity plus load impedance changes during a heating operation as the temperature of the load 264 increases and the load 264 cooks. The cavity plus load impedance has a direct effect on the magnitude of reflected signal power along the conductive transmission path 228 between the RF signal source 220 and electrode 240. In most cases, it is desirable to maximize the magnitude of transferred signal power into the cavity 260, and/or to minimize the reflected-to-forward signal power ratio along the conductive transmission path 228.

In order to at least partially match the output impedance of the RF signal generator 220 to the cavity plus load impedance, a first matching circuit 234 is electrically coupled along the transmission path 228, in an embodiment. The first matching circuit 234 may have any of a variety of configurations. According to an embodiment, the first matching circuit 234 includes fixed components (i.e., components with non-variable component values), although the first matching circuit 234 may include one or more variable components, in other embodiments. For example, the first matching circuit 234 may include any one or more circuits selected from an inductance/capacitance (LC) network, a series inductance network, a shunt inductance network, or a combination of bandpass, high-pass and low-pass circuits, in various embodiments. Essentially, the fixed matching circuit 234 is configured to raise the impedance to an intermediate level between the output impedance of the RF signal generator 220 and the cavity plus load impedance.

According to an embodiment, power detection circuitry 230 is coupled along the transmission path 228 between the output of the RF signal source 220 and the electrode 240. In a specific embodiment, the power detection circuitry 230 forms a portion of the RF subsystem 210, and is coupled to the conductor 228-2 between the output of the first matching circuit 234 and the input to the variable impedance matching network 270. In alternate embodiments, the power detection circuitry 230 may be coupled to the portion 228-1 of the transmission path 228 between the output of the RF signal source 220 and the input to the first matching circuit 234, or to the portion 228-3 of the transmission path 228 between the output of the variable impedance matching network 270 and the first electrode 240.

Wherever it is coupled, power detection circuitry 230 is configured to monitor, measure, or otherwise detect the power of the reflected signals traveling along the transmission path 228 between the RF signal source 220 and electrode 240 (i.e., reflected RF signals traveling in a direction from electrode 240 toward RF signal source 220). In some embodiments, power detection circuitry 230 also is configured to detect the power of the forward signals traveling along the transmission path 228 between the RF signal source 220 and the electrode 240 (i.e., forward RF signals traveling in a direction from RF signal source 220 toward electrode 240). Over connection 232, power detection circuitry 230 supplies signals to RF heating system controller 212 through controller 282 conveying the magnitudes of the reflected signal power (and the forward signal power, in some embodiments). In embodiments in which both the forward and reflected signal power magnitudes are conveyed, RF heating system controller 212 may calculate a reflected-to-forward signal power ratio, or an S11 parameter, or a voltage standing wave ration (VSWR) value. As will be described in more detail below, when the reflected signal power magnitude exceeds a reflected signal power threshold, or when the reflected-to-forward signal power ratio exceeds an S11 parameter threshold, or when a VSWR value exceeds a VSWR threshold, this indicates that the system 200 is not adequately matched to the cavity plus load impedance, and that energy absorption by the load 264 within the cavity 260 may be sub-optimal. In such a situation, RF heating system controller 212 orchestrates a process of altering the state of the variable matching network 270 to drive the reflected signal power or the S11 parameter or the VSWR value toward or below a desired level (e.g., below the reflected signal power threshold, and/or the reflected-to-forward signal power ratio threshold, and/or the S11 parameter threshold, and/or the VSWR threshold), thus re-establishing an acceptable match and facilitating more optimal energy absorption by the load 264.

Adjustment of the configuration of the variable matching circuit 270 desirably decreases the magnitude of reflected signal power, which corresponds to decreasing the magnitude of the S11 parameter and/or VSWR, and increasing the power absorbed by the load 264.

As discussed above, the variable impedance matching network 270 is used to match the cavity plus load impedance of the cavity 260 plus load 264 and container 265 to maximize, to the extent possible, the RF power transfer into the load 264. The initial impedance of the cavity 260, the load 264 and container 265 may not be known with accuracy at the beginning of a heating operation. Further, the impedance of the load 264 changes during a heating operation as the load 264 warms up. According to an embodiment, the RF heating system controller 212 may provide control signals to the variable impedance matching network 270, which cause modifications to the state of the variable impedance matching network 270. This enables the RF heating system controller 212 to establish an initial state of the variable impedance matching network 270 at the beginning of the heating operation that has a relatively low reflected to forward power ratio, and thus a relatively high absorption of the RF power by the load 264. In addition, this enables the RF heating system controller 212 to modify the state of the variable impedance matching network 270 so that an adequate match may be maintained throughout the heating operation, despite changes in the impedance of the load 264.

Some embodiments of heating system 200 may include temperature sensor(s), IR sensor(s), and/or weight sensor(s) 294. The temperature sensor(s) and/or IR sensor(s) may be positioned in locations that enable the temperature of the load 264 to be sensed during the heating operation. When provided to the host/thermal system controller 252 and/or the RF heating system controller 212, for example, the temperature information enables the host/thermal system controller 252 and/or the RF heating system controller 212 to alter the power of the thermal energy produced by the thermal heating components 254 and/or the RF signal supplied by the RF signal source 220 (e.g., by controlling the bias and/or supply voltages provided by the power supply and bias circuitry 226), and/or to determine when the heating operation should be terminated. In addition, the RF heating system controller 212 may use the temperature information to adjust the state of the variable impedance matching network 270. The weight sensor(s) may be positioned under the load 264 or the container 265 of the load 264, and are configured to provide an estimate of the weight and/or mass of the load 264 to the host/thermal system controller 252 and/or the RF heating system controller 212. The host/thermal system controller 252 and/or RF heating system controller 212 may use this information, for example, to determine an approximate duration for the heating operation. Further, the RF heating system controller 212 may use this information to determine a desired power level for the RF signal supplied by the RF signal source 220, and/or to determine an initial setting for the variable impedance matching network 270.

The description associated with FIG. 2A discusses, in detail, an "unbalanced" heating apparatus, in which an RF signal is applied to one electrode (e.g., electrode 240, FIG. 2A), and the other electrode (e.g., electrode 242 or the containment structure 266, FIG. 2A) is grounded. As mentioned above, an alternate embodiment of a heating apparatus comprises a "balanced" heating apparatus. In such an apparatus, balanced RF signals are provided to both electrodes (e.g., by a push-pull amplifier). Specifically, in a balanced apparatus, the variable matching subsystem 270 houses an apparatus configured to receive, at an input of the apparatus, an unbalanced RF signal from the RF signal source 220 over the unbalanced portion of the transmission path, to convert the unbalanced RF signal into two balanced RF signals (e.g., two RF signals having a phase difference between 120 and 340 degrees, such as about 180 degrees), and to produce the two balanced RF signals at two outputs of the apparatus. For example, the conversion apparatus may be a balun, in an embodiment. The balanced RF signals could then be conveyed over separate conductors to electrodes 240, 242.

In an alternate balanced embodiment, an alternate RF signal generator 220 may produce balanced RF signals on separate output conductors, which may be directly coupled via appropriate matching circuits to electrodes 240, 242. In such an embodiment, a balun may be excluded from the system 200.

For example, FIG. 2B is a simplified block diagram of a balanced heating system 1200 (e.g., heating system 100, FIG. 1), in accordance with an example embodiment. Heating system 1200 includes host/thermal system controller 1252, RF heating system 1210, thermal heating system 1250, user interface 1292, and a containment structure 1266 that defines a cavity 1260, in an embodiment. It should be understood that FIG. 2B is a simplified representation of a heating system 1200 for purposes of explanation and ease of description, and that practical embodiments may include other devices and components to provide additional functions and features, and/or the heating system 1200 may be part of a larger electrical system.

The containment structure 1266 may include bottom, top, and side walls, the interior surfaces of which define the cavity 1260 (e.g., cavity 110, FIG. 1). According to an embodiment, the cavity 1260 may be sealed (e.g., with a door 116, FIG. 1) to contain the heat and electromagnetic energy that is introduced into the cavity 1260 during a heating operation. The system 1200 may include one or more interlock mechanisms that ensure that the seal is intact during a heating operation. If one or more of the interlock mechanisms indicates that the seal is breached, the host/thermal system controller 1252 may cease the heating operation.

User interface 1292 may correspond to a control panel (e.g., control panel 120, FIG. 1), for example, which enables a user to provide inputs to the system regarding parameters for a heating operation (e.g., the cooking mode, characteristics of the load to be heated, and so on), start and cancel buttons, mechanical controls (e.g., a door/drawer open latch), and so on. In addition, the user interface may be configured to provide user-perceptible outputs indicating the status of a heating operation (e.g., a countdown timer, visible indicia indicating progress or completion of the heating operation, and/or audible tones indicating completion of the heating operation) and other information.

The host/thermal system controller 1252 may perform functions associated with the overall system 1200 (e.g., "host control functions"), and functions associated more particularly with the thermal heating system 1250 (e.g., "thermal system control functions"). Because, in an embodiment, the host control functions and the thermal system control functions may be performed by one hardware controller, the host/thermal system controller 1252 is shown as a dual-function controller. In alternate embodiments, the host controller and the thermal system controller may be distinct controllers that are communicatively coupled.

The thermal heating system 1250 includes host/thermal system controller 1252, one or more optional thermal heating components 1254, and an optional thermostat 1256. Host/thermal system controller 1252 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, host/thermal system controller 1252 is coupled to user interface 1292, RF heating system controller 1212, thermal heating components 1254, thermostat 1256, and sensors 1294 (if included). In some embodiments, host/thermal system controller 1252 and portions of user interface 1292 may be included together in a host module 1290.

Host/thermal system controller 1252 is configured to receive signals indicating user inputs received via user interface 1292, and to provide signals to the user interface 1292 that enable the user interface 1292 to produce user-perceptible outputs (e.g., via a display, speaker, and so on) indicating various aspects of the system operation. In addition, host/thermal system controller 1252 sends control signals to other components of the thermal heating system 1250 (e.g., to thermal heating components 1254) to selectively activate, deactivate, and otherwise control those other components in accordance with desired system operation. The host/thermal system controller 1252 also may receive signals from the thermal heating system components 1254, thermostat 1256, and sensors 1294 (if included), indicating operational parameters of those components, and the host/thermal system controller 1252 may modify operation of the system 1200 accordingly, as will be described later. Further still, host/thermal system controller 1252 receives signals from the RF heating system controller 1212 regarding operation of the RF heating system 1210. Responsive to the received signals and measurements from the user interface 1292 and from the RF heating system controller 1212, host/thermal system controller 1252 may provide additional control signals to the RF heating system controller 1212, which affects operation of the RF heating system 1210.

The one or more thermal heating components 1254 may include, for example, one or more heating elements within a convection system, one or more gas burners, and/or other components that are configured to heat air within the cavity 1260. The thermostat 1256 is configured to sense the air temperature within the cavity 1260, and to control operation of the one or more thermal heating components 1254 to maintain the air temperature within the cavity at or near a temperature setpoint (e.g., a temperature setpoint established by the user through the user interface 1292). This temperature control process may be performed by the thermostat 1256 in a closed loop system with the thermal heating components 1254, or the thermostat 1256 may communicate with the host/thermal system controller 1252, which also participates in controlling operation of the one or more thermal heating components 1254. In some embodiments, a fan may be included when the system 1200 includes a convection heating system and the fan can be selectively activated and deactivated to circulate the air within the cavity.

The RF subsystem 1210 includes an RF heating system controller 1212, an RF signal source 1220, a first impedance matching circuit 1234 (herein "first matching circuit"), power supply and bias circuitry 1226, and power detection circuitry 1230, in an embodiment. RF heating system controller 1212 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, RF heating system controller 1212 is coupled to host/thermal system controller 1252, RF signal source 1220, variable impedance matching network 1270, power detection circuitry 1230, and sensors 1294 (if included). RF heating system controller 1212 is configured to receive control signals from the host/thermal system controller 1252 indicating various operational parameters, and to receive signals indicating RF signal reflected power (and possibly RF signal forward power) from power detection circuitry 1230. Detector 230 communicates its measurements to controller 1282 which, in turn, transmits the measurements to RF heating system controller 1212. Responsive to the received signals and measurements RF heating system controller 1212 provides control signals to the power supply and bias circuitry 1226 and to the RF signal generator 1222 of the RF signal source 1220. In addition, RF heating system controller 1212 provides control signals to controller 1282, which is configured to cause the variable impedance matching network 1270 to change its state or configuration. Controller 1282 provides control signals that change the values of variable passive components (e.g., variable inductances and/or capacitances) within the variable impedance matching network 1270 to change their values. For example, controller 1282 may control various mechanical or electrical switches/relays within the variable impedance matching network 1270 to switch passive components into and/or out of the variable impedance matching network 1270, which affects the overall impedance transformation provided by the variable impedance matching network 1270.

In embodiments, variable impedance matching network 1270 may include components (e.g., relays and the like) that require a DC power supply to operate. Accordingly, system 1200 includes DC source 1284 configured to supply a DC power supply signal to variable matching circuit 1270 via conductor 1285.

Cavity 1260 includes a capacitive heating arrangement with first and second parallel plate electrodes 1240, 1242 that are separated by an air cavity 1260 within which a load 1264 to be heated may be placed. For example, a first electrode 1240 may be positioned above the air cavity 1260, and a second electrode 1242 may be positioned below the air cavity 1260. In some embodiments, the second electrode 1242 may be implemented in the form of a shelf or contained within a shelf that is inserted in the cavity 1260 as previously described. To avoid direct contact between the load 1264 and the second electrode 1242 (or the grounded bottom surface of the cavity 1260), a non-conductive barrier 1262 may be positioned over the second electrode 1242.

Again, cavity 1260 includes a capacitive heating arrangement with first and second parallel plate electrodes 1240, 1242 that are separated by an air cavity 1260 within which a load 1264 to be heated may be placed. The first and second electrodes 1240, 1242 are positioned within containment structure 1266 to define a distance 1246 between the electrodes 1240, 1242, where the distance 1246 renders the cavity 1260 a sub-resonant cavity, in an embodiment.

In general, an RF heating system 1210 designed for lower operational frequencies (e.g., frequencies between 10 MHz and 100 MHz) may be designed to have a distance 1246 that is a smaller fraction of one wavelength. For example, when system 1210 is designed to produce an RF signal with an operational frequency of about 10 MHz (corresponding to a wavelength of about 30 meters), and distance 1246 is selected to be about 0.5 meters, the distance 1246 is about one 60th of one wavelength of the RF signal. Conversely, when system 1210 is designed for an operational frequency of about 300 MHz (corresponding to a wavelength of about 1 meter), and distance 1246 is selected to be about 0.5 meters, the distance 1246 is about one half of one wavelength of the RF signal.

With the operational frequency and the distance 1246 between electrodes 1240, 1242 being selected to define a sub-resonant interior cavity 1260, the first and second electrodes 1240, 1242 are capacitively coupled. More specifically, the first electrode 1240 may be analogized to a first plate of a capacitor, the second electrode 1242 may be analogized to a second plate of a capacitor, and the load 1264, barrier 1262 (if included), and air within the cavity 1260 may be analogized to a capacitor dielectric. Accordingly, the first electrode 1240 alternatively may be referred to herein as an "anode," and the second electrode 1242 may alternatively be referred to herein as a "cathode."

Essentially, the voltage across the first electrode 1240 and the second electrode 1242 contributes to heating the load 1264 within the cavity 1260. According to various embodiments, the RF heating system 1210 is configured to generate the RF signal to produce voltages between the electrodes 1240, 1242 in a range of about 20 volts to about 3,000 volts, in one embodiment, or in a range of about 3,000 volts to about 10,000 volts, in another embodiment, although the system 1210 may be configured to produce lower or higher voltages between the electrodes 1240, 1242, as well.

An output of the RF subsystem 1210, and more particularly an output of RF signal source 1220, is electrically coupled to the variable matching subsystem 1270 through a conductive transmission path, which includes a plurality of conductors 1228-1, 1228-2, 1228-3, 1228-4, and 1228-5 connected in series, and referred to collectively as transmission path 1228. According to an embodiment, the conductive transmission path 1228 includes an "unbalanced" portion and a "balanced" portion, where the "unbalanced" portion is configured to carry an unbalanced RF signal (i.e., a single RF signal referenced against ground), and the "balanced" portion is configured to carry a balanced RF signal (i.e., two signals referenced against each other). The "unbalanced" portion of the transmission path 1228 may include unbalanced first and second conductors 1228-1, 1228-2 within the RF subsystem 1210, one or more connectors 1236, 1238 (each having male and female connector portions), and an unbalanced third conductor 1228-3 electrically coupled between connectors 1236, 1238. According to an embodiment, the third conductor 1228-3 comprises a coaxial cable, although the electrical length may be shorter or longer, as well. In an alternate embodiment, the variable matching subsystem 1270 may be housed with the RF subsystem 1210, and in such an embodiment, the conductive transmission path 1228 may exclude the connectors 1236, 1238 and the third conductor 1228-3. Either way, the "balanced" portion of the conductive transmission path 1228 includes a balanced fourth conductor 1228-4 within the variable matching subsystem 1270, and a balanced fifth conductor 1228-5 electrically coupled between the variable matching subsystem 1270 and electrodes 1240, 1242, in an embodiment.

As indicated in FIG. 2B, the variable matching subsystem 1270 houses an apparatus configured to receive, at an input of the apparatus, the unbalanced RF signal from the RF signal source 1220 over the unbalanced portion of the transmission path (i.e., the portion that includes unbalanced conductors 1228-1, 1228-2, and 1228-3), to convert the unbalanced RF signal into two balanced RF signals (e.g., two RF signals having a phase difference between 120 and 340 degrees, such as about 180 degrees), and to produce the two balanced RF signals at two outputs of the apparatus. For example, the conversion apparatus may be a balun 1274, in an embodiment. The balanced RF signals are conveyed over balanced conductors 1228-4 to the variable matching circuit 1272 and, ultimately, over balanced conductors 1228-5 to the electrodes 1240, 1242. In an embodiments, balanced conductors 1228-5 are first and second outputs of RF subsystem 1210 in which RF subsystem 1210 is an RF signal source of device 1200.

In an alternate embodiment, as indicated in a dashed box in the center of FIG. 2B, and as will be discussed in more detail below, an alternate RF signal generator 1220' may produce balanced RF signals on balanced conductors 1228-1', which may be directly coupled to the variable matching circuit 1272 (or coupled through various intermediate conductors and connectors). In such an embodiment, the balun 1274 may be excluded from the system 1200. Either way, a double-ended variable matching circuit 1272 is configured to receive the balanced RF signals (e.g., over connections 1228-4 or 1228-1'), to perform an impedance transformation corresponding to a then-current configuration of the double-ended variable matching circuit 1272, and to provide the balanced RF signals to the first and second electrodes 1240, 1242 over connections 1228-5.

According to an embodiment, RF signal source 1220 includes an RF signal generator 1222 and a power amplifier 1224 (e.g., including one or more power amplifier stages). In response to control signals provided by RF heating system controller 1212 over connection 1214, RF signal generator 1222 is configured to produce an oscillating electrical signal having a frequency in an ISM (industrial, scientific, and medical) band, although the system could be modified to support operations in other frequency bands, as well. The RF signal generator 1222 may be controlled to produce oscillating signals of different power levels and/or different frequencies, in various embodiments. For example, the RF signal generator 1222 may produce a signal that oscillates in the VHF range (i.e., in a range between about 30.0 MHz and about 300 MHz), and/or in a range of about 10.0 MHz to about 100 MHz and/or in a range of about 100 MHz to about 3.0 GHz. Some desirable frequencies may be, for example, 13.56 MHz (+/−12 percent), 27.125 MHz (+/−12 percent), 40.68 MHz (+/−12 percent), and 915 MHz (+/−12 percent). Alternatively, the frequency of oscillation may be lower or higher than the above-given ranges or values.

The power amplifier 1224 is configured to receive the oscillating signal from the RF signal generator 1222, and to amplify the signal to produce a significantly higher-power signal at an output of the power amplifier 1224. For example, the output signal may have a power level in a range of about 100 W to about 400 W or more, although the power level may be lower or higher, as well. The gain applied by the power amplifier 1224 may be controlled using gate bias voltages and/or drain bias voltages provided by the power supply and bias circuitry 1226 to one or more stages of amplifier 1224. More specifically, power supply and bias circuitry 1226 provides bias and supply voltages to the inputs and/or outputs (e.g., gates and/or drains) of each RF amplifier stage in accordance with control signals received from RF heating system controller 1212.

The power amplifier may include one or more amplification stages. In an embodiment, each stage of amplifier 1224 is implemented as a power transistor, such as a FET, having an input terminal (e.g., a gate or control terminal) and two current carrying terminals (e.g., source and drain terminals). Impedance matching circuits (not illustrated) may be coupled to the input (e.g., gate) and/or output (e.g., drain terminal) of some or all of the amplifier stages, in various embodiments. In an embodiment, each transistor of the amplifier stages includes an LDMOS FET. However, it should be noted that the transistors are not intended to be limited to any particular semiconductor technology, and in other embodiments, each transistor may be realized as a GaN transistor, another type of MOS FET transistor, a BJT, or a transistor utilizing another semiconductor technology.

In FIG. 2B, the power amplifier arrangement 1224 is depicted to include one amplifier stage coupled in a particular manner to other circuit components. In other embodiments, the power amplifier arrangement 1224 may include other amplifier topologies and/or the amplifier arrangement may include two or more amplifier stages. For example, the power amplifier arrangement may include various embodiments of a single-ended amplifier, a double-ended (balanced) amplifier, a push-pull amplifier, a Doherty amplifier, an SMPA, or another type of amplifier.

For example, as indicated in the dashed box in the center of FIG. 2B, an alternate RF signal generator 1220' may include a push-pull or balanced amplifier 1224', which is configured to receive, at an input, an unbalanced RF signal from the RF signal generator 1222, to amplify the unbalanced RF signal, and to produce two balanced RF signals at two outputs of the amplifier 1224', where the two balanced RF signals are thereafter conveyed over conductors 1228-1' to the electrodes 1240, 1242. In such an embodiment, the balun 1274 may be excluded from the system 1200, and the conductors 1228-1' may be directly connected to the variable matching circuit 1272 (or connected through multiple coaxial cables and connectors or other multi-conductor structures).

Cavity 1260 and any load 1264 (e.g., food, liquids, and so on) positioned in the cavity 1260 present a cumulative load for the electromagnetic energy (or RF power) that is radiated into the cavity 1260 by the electrodes 1240, 1242. More specifically, and as described previously, the cavity 1260 and the load 1264 present an impedance to the system, referred to herein as a "cavity plus load impedance." The cavity plus load impedance changes during a heating operation as the temperature of the load 1264 increases. The cavity plus load impedance has a direct effect on the magnitude of reflected signal power along the conductive transmission path 1228 between the RF signal source 1220 and the electrodes 1240, 1242. In most cases, it is desirable to maximize the magnitude of transferred signal power into the cavity 1260, and/or to minimize the reflected-to-forward signal power ratio along the conductive transmission path 1228.

In order to at least partially match the output impedance of the RF signal generator 1220 to the cavity plus load impedance, a first matching circuit 1234 is electrically coupled along the transmission path 1228, in an embodiment. The first matching circuit 1234 is configured to perform an impedance transformation from an impedance of the RF signal source 1220 (e.g., less than about 10 ohms) to an intermediate impedance (e.g., 120 ohms, 75 ohms, or some other value). The first matching circuit 1234 may have any of a variety of configurations. According to an embodiment, the first matching circuit 1234 includes fixed components (i.e., components with non-variable component values), although the first matching circuit 1234 may include one or more variable components, in other embodiments. For example, the first matching circuit 1234 may include any one or more circuits selected from an inductance/capacitance (LC) network, a series inductance network, a shunt inductance network, or a combination of bandpass, high-pass and low-pass circuits, in various embodiments. Essentially, the first matching circuit 1234 is configured to raise the impedance to an intermediate level between the output impedance of the RF signal generator 1220 and the cavity plus load impedance.

According to an embodiment, and as mentioned above, power detection circuitry 1230 is coupled along the transmission path 1228 between the output of the RF signal source 1220 and the electrodes 1240, 1242. In a specific embodiment, the power detection circuitry 1230 forms a portion of the RF subsystem 1210, and is coupled to the conductor 1228-2 between the RF signal source 1220 and connector 1236. In alternate embodiments, the power detection circuitry 1230 may be coupled to any other portion of the transmission path 1228, such as to conductor 1228-1, to conductor 1228-3, to conductor 1228-4 between the RF signal source 1220 (or balun 1274) and the variable matching circuit 1272 (i.e., as indicated with power detection circuitry 1230'), or to conductor 1228-5 between the variable matching circuit 1272 and the electrode(s) 1240, 1242 (i.e., as indicated with power detection circuitry 1230"). For purposes of brevity, the power detection circuitry is referred to herein with reference number 1230, although the circuitry may be positioned in other locations, as indicated by reference numbers 1230' and 1230".

Wherever it is coupled, power detection circuitry 1230 is configured to monitor, measure, or otherwise detect the power of the reflected signals traveling along the transmission path 1228 between the RF signal source 1220 and one or both of the electrode(s) 1240, 1242 (i.e., reflected RF signals traveling in a direction from electrode(s) 1240, 1242 toward RF signal source 1220). In some embodiments, power detection circuitry 1230 also is configured to detect the power of the forward signals traveling along the transmission path 1228 between the RF signal source 1220 and the electrode(s) 1240, 1242 (i.e., forward RF signals traveling in a direction from RF signal source 1220 toward electrode(s) 1240, 1242).

Over connection 1232, power detection circuitry 1230 supplies signals to RF heating system controller 1212 conveying the measured magnitudes of the reflected signal power through controller 1282, and in some embodiments, also the measured magnitude of the forward signal power. In embodiments in which both the forward and reflected signal power magnitudes are conveyed, RF heating system controller 1212 may calculate a reflected-to-forward signal power ratio, or the S11 parameter, and/or a VSWR value. As will be described in more detail below, when the reflected signal power magnitude exceeds a reflected signal power threshold, or when the reflected-to-forward signal power ratio exceeds an S11 parameter threshold, or when the VSWR value exceeds a VSWR threshold, this indicates that the system 1200 is not adequately matched to the cavity plus load impedance, and that energy absorption by the load 1264 within the cavity 1260 may be sub-optimal. In such a situation, RF heating system controller 1212 may orchestrate a process of altering the state of the variable matching circuit 1272 to drive the reflected signal power or the S11 parameter or the VSWR value toward or below a desired level (e.g., below the reflected signal power threshold, and/or the reflected-to-forward signal power ratio threshold, and/or the VSWR threshold), thus re-establishing an acceptable match and facilitating more optimal energy absorption by the load 1264.

Adjustment of the configuration of the variable matching circuit 1272 desirably decreases the magnitude of reflected signal power, which corresponds to decreasing the magnitude of the S11 parameter and/or the VSWR value, and increasing the power absorbed by the load 1264.

As discussed above, the variable matching circuit 1272 is used to match the input impedance of the cavity 1260 plus load 1264 to maximize, to the extent possible, the RF power transfer into the load 1264. The initial impedance of the cavity 1260 and the load 1264 may not be known with accuracy at the beginning of a heating operation. Further, the impedance of the load 1264 changes during a heating operation as the load 1264 warms up. According to an embodiment, the system controller 1212 may provide control signals to the variable matching circuit 1272, which cause modifications to the state of the variable matching circuit 1272. This enables the system controller 1212 to establish an initial state of the variable matching circuit 1272 at the beginning of the heating operation that has a relatively low reflected to forward power ratio, and thus a relatively high absorption of the RF power by the load 1264. In addition, this enables the system controller 1212 to modify the state of the variable matching circuit 1272 so that an adequate match may be maintained throughout the heating operation, despite changes in the impedance of the load 1264.

The variable matching circuit 1272 may have any of a variety of configurations. For example, the circuit 1272 may include any one or more circuits selected from an inductance/capacitance (LC) network, an inductance-only network, a capacitance-only network, or a combination of bandpass, high-pass and low-pass circuits, in various embodiments. In an embodiment in which the variable matching circuit 1272 is implemented in a balanced portion of the transmission path 1228, the variable matching circuit 1272 is a double-ended circuit with two inputs and two outputs. In an alternate embodiment in which the variable matching circuit is implemented in an unbalanced portion of the transmission path 1228, the variable matching circuit may be a single-ended circuit with a single input and a single output. According to a more specific embodiment, the variable matching circuit 1272 includes a variable inductance network. According to another more specific embodiment, the variable matching circuit 1272 includes a variable capacitance network. In still other embodiments, the variable matching circuit 1272 may include both variable inductance and variable capacitance elements. The inductance, capacitance, and/or resistance values provided by the variable matching circuit 1272, which in turn affect the impedance transformation provided by the circuit 1272, are established through control signals from the RF heating system controller 1212, as will be described in more detail later. In any event, by changing the state of the variable matching circuit 1272 over the course of a heating operation to dynamically match the ever-changing impedance of the cavity 1260 plus the load 1264 within the cavity 1260, the system efficiency may be maintained at a high level throughout the heating operation.

Some embodiments of heating system 1200 may include temperature sensor(s), IR sensor(s), and/or weight sensor(s) 1294. The temperature sensor(s) and/or IR sensor(s) may be positioned in locations that enable the temperature of the load 1264 to be sensed during the heating operation. When provided to the host/thermal system controller 1252 and/or the RF heating system controller 1212, for example, the temperature information enables the host/thermal system controller 1252 and/or the RF heating system controller 1212 to alter the power of the thermal energy produced by the thermal heating components 1254 and/or the RF signal supplied by the RF signal source 1220 (e.g., by controlling the bias and/or supply voltages provided by the power supply and bias circuitry 1226), and/or to determine when the heating operation should be terminated. In addition, the RF heating system controller 1212 may use the temperature information to adjust the state of the variable impedance matching network 1270. The weight sensor(s) are positioned under the load 1264, and are configured to provide an estimate of the weight and/or mass of the load 1264 to the host/thermal system controller 1252 and/or the RF heating system controller 1212. The host/thermal system controller 1252 and/or RF heating system controller 1212 may use this information, for example, to determine an approximate duration for the heating operation. Further, the RF heating system controller 1212 may use this information to determine a desired power level for the RF signal supplied by the RF signal source 1220, and/or to determine an initial setting for the variable impedance matching network 1270.

According to various embodiments, the circuitry associated with the single-ended or double-ended variable impedance matching networks discussed herein may be implemented in the form of one or more modules, where a "module" is defined herein as an assembly of electrical components coupled to a common substrate (e.g., a printed circuit board (PCB), collection of PCBs, or other substrates). In addition, as mentioned previously, the host/thermal system controller (e.g., controller 252, 1252, FIGS. 2A, 2B) and portions of the user interface (e.g., user interface 292, 1292, FIGS. 2A, 2B) may be implemented in the form of a host module (e.g., host module 290, 1290, FIGS. 2A, 2B). Further still, in various embodiments, the circuitry associated with the generation and control of the RF signal generation portions of the RF heating system (e.g., RF heating system controller, 212, 1212, power supply and bias circuitry 226, 1226, and RF signal source 220, 1220, FIGS. 2A, 2B) also may be implemented in the form of one or more modules referred to herein as power amplifier module (PAM) 286, 1286. In an embodiment, the circuitry associated with a number of system components including first matching circuits 234, 1234, variable impedance matching networks 270, 1270, controllers 282, 1282, and detectors 230, 1230, may be implemented as one or more modules (referred to herein as the smart tuning unit (STU) module 288, 1288). In some embodiments, STU modules 288, 1288 may be located within containment structures 266, 1266, respectively. In that case, conductors 232, 228, 1232, and 1228 may be configured to pass through their respective containment structures to establish appropriate electrical connections.

In the present disclosure, a heating system is configured to defrost or heat a load using RF energy. The system may use solid state amplifiers at relatively low frequencies (e.g., from about 1 MHz to about 300 MHz) as compared to conventional microwave technologies to generate the RF energy that is applied to a heating cavity of the system. Additionally, the relatively high field strength enables cooking of the food load using lower power levels (e.g., up to or around 300 W) as compared to conventional food cooking systems.

In the RF heating systems 210, 1210 illustrated in FIGS. 2A and 2B, several conductors (e.g., cables) are connected between PAMs 286, 1286 and STUs 288, 1288, respectively. For example, conductors 228, 1228 carry the RF energy from RF signal source 220, 1220 to one or more of the electrodes in containment structures 266, 1266. Conductors 232, 1232 may separately be used to receive signals from detectors 230 or other components within STUs 288, 1288, which may include status signals from components therein that may include status signals of containment structures 266, 1266 (e.g., current temperature, door open/close status, and the like). Conductors 285, 1285 carry a DC signal to STUs 288, 1288, respectively.

Figure 3:
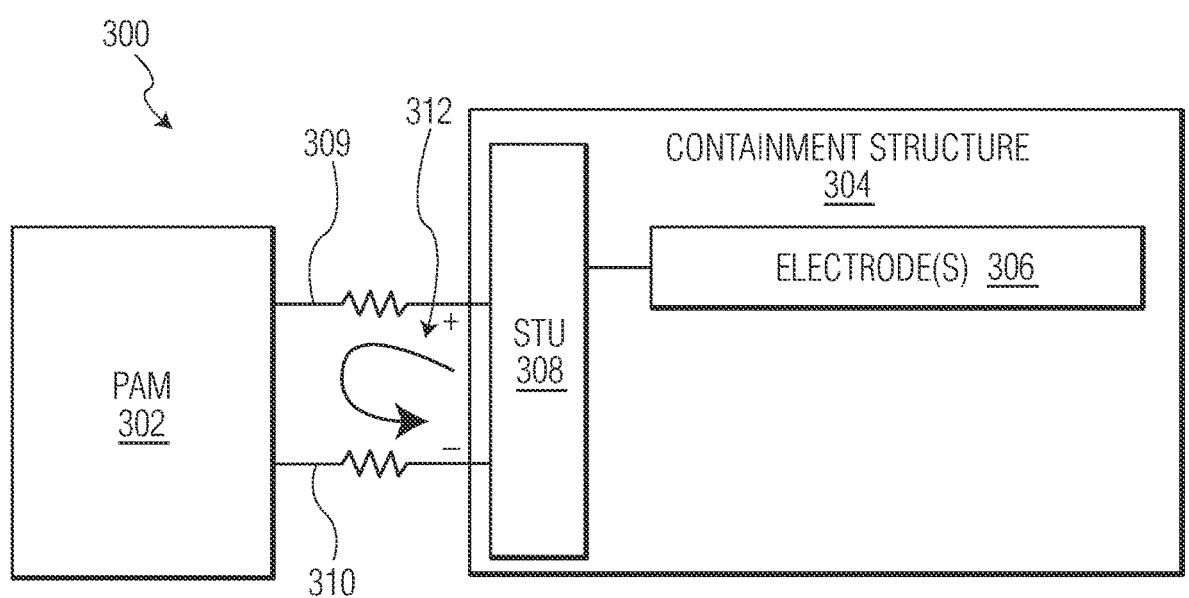
FIG. 3 is a simplified illustration of an RF heating system depicting multiple conductors or cables connected between components of the system.

FIG. 3 is a simplified illustration of an RF heating system 300 depicting the multiple conductors or cables connected between components of the system 300. System 300 includes PAM 302 (e.g., PAM 286, 1286, FIGS. 2A, 2B) and containment structure 304 (e.g., containment structure 266, 1266, FIGS. 2A, 2B). Containment structure 304 contains electrode(s) 306 (e.g., electrodes 240, 242, 1240, 1242, FIGS. 2A, 2B) and STU 308 (e.g., STU 288, 1288, FIGS. 2A, 2B).

A first cable 309 is connected between PAM 302 and STU 308. First cable 309 may be similar to conductors 232, 1232 FIGS. 2A, 2B and is configured to carry control messages from an RF heating system controller (e.g., RF heating system controller 212, 1212, FIGS. 2A, 2B) of PAM 302 to a controller (e.g., controller 282, 1282, FIGS. 2A, 2B) of the variable impedance matching circuit (e.g., variable impedance matching network 270, 1270, FIGS. 2A, 2B) of STU 308.

A separate cable 310 is connected between PAM 302 and STU 308. Cable 310 may be similar to conductors 228-2, 1228-2, 1228-3, FIGS. 2A, 2B and is configured to carry the high RF energy outputted by the RF signal source (e.g., RF signal sources 220, 1220, FIGS. 2A, 2B) of PAM 302.

This two-cable 309, 310 design between PAM 302 and STU 308 in containment structure 304 can bring inconvenience to the manufacturing process for RF heating system 300, because the assembler is required to establish four separate connections between PAM 302 and STU 308. Additional cables (e.g., establishing DC power signals) may require additional connections to be established still. This inconvenience can be increased for system installations in which the RF heating system 300 is arranged as part of a defrosting system within a larger appliance, such as a refrigerator where establishing such connections may be awkward.

Additionally, in some embodiments, the two cables 309, 310 solution can generate some electromagnetic emissions. Specifically, because the length of cables 309, 310 tends to be relatively long, (e.g., from 1-2 meters in some installations), the cable length is somewhat comparable with the quarter-wave length of 40.68 MHz, a typical operating frequency of the RF signal source within PAM 302. Although potential RF signal leakage from cable 310 (the cable configured to carry the RF signal from PAM 302 to STU 308) can be mitigated by appropriate shielding and by appropriate impedance matching, the separate cable 309 carrying instructions to STU 308 may separately radiate the RF energy if cable 309 is not appropriately shielded. Additionally, a current loop path 312 may be formed between the ground lines of the two cables 309, 310, as shown in FIG. 3. If the grounds of cables 309 and 310 have different resistances, that could cause the voltage potential differences between cables 309 and 310 to differ, potentially creating RF loop current 312, which may result in some emission of RF interference.

Figure 4:
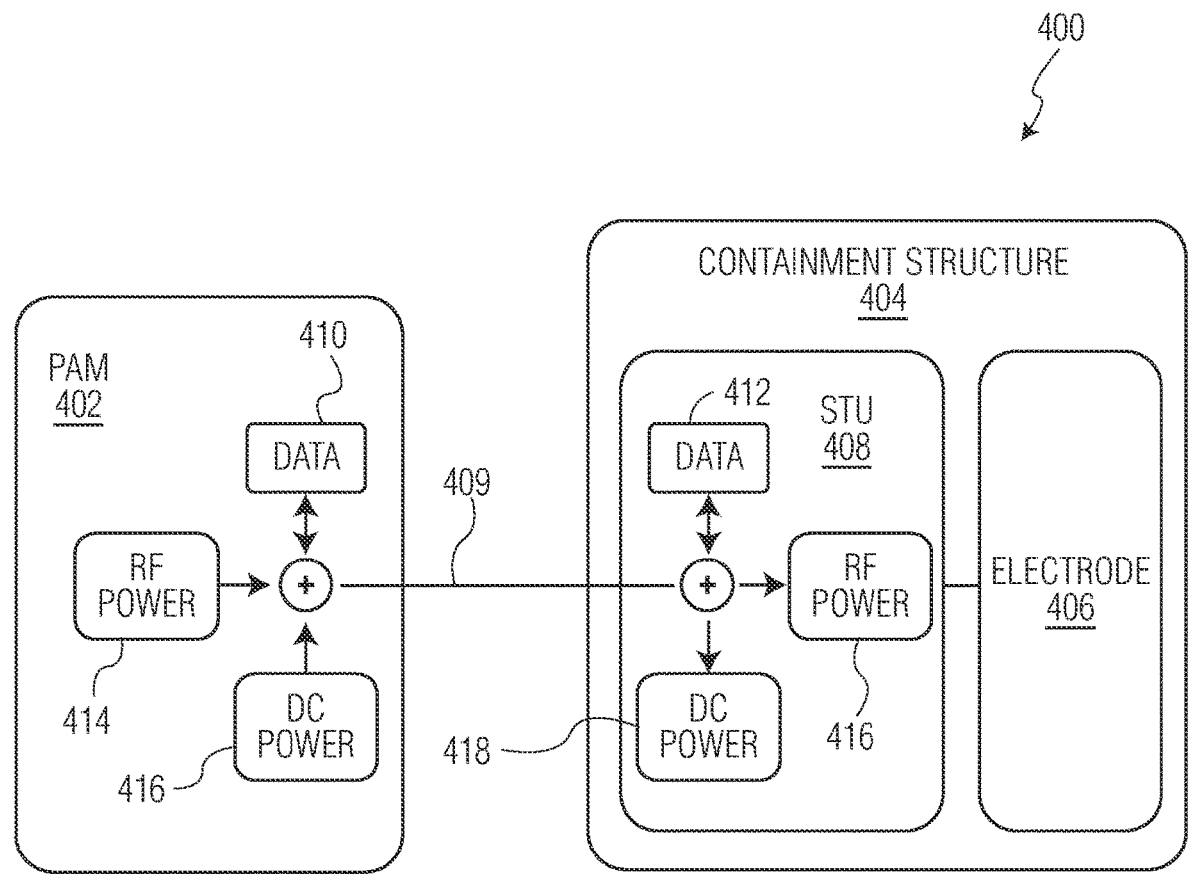
FIG. 4 is a simplified block diagram of an embodiment of an RF heating system in which the multiple cable connections between the system's PAM and STU as depicted in FIG. 3 are replaced by a single cable solution.

In the present system, a single cable (e.g., a 50-ohm transmission line) is utilized to form the necessary connections between PAM 302 and STU 308 in which the single cable carries the RF signal as well as data signals and any required DC voltages. FIG. 4 is a simplified block diagram in which the multiple cable connections between a PAM and STU depicted in FIG. 3 are replaced by a single cable solution.

RF heating system 400 includes PAM 402 (e.g., PAM 286, 1286, FIGS. 2A, 2B) and containment structure 404 (e.g., containment structure 266, 1266, FIGS. 2A, 2B).

Containment structure 404 contains the system heating cavity (e.g., cavity 260, 1260, FIGS. 2A, 2B), electrode(s) 406 (e.g., electrodes 240, 242, 1240, 1242, FIGS. 2A, 2B) and STU 408 (e.g., STU 288, 1288, FIGS. 2A, 2B).

Cable 409 is connected between PAM 402 and STU 408. Cable 409 may be implemented as a 50 ohm transmission line cable. Such a cable may include a central conductor and a grounded shield that surrounds, but is electrically isolated from, the central conductor. As such, cable 409 may include only a single conductor that is arranged to carry multiple signals, as describe below. This may be in contrast to a physical cable that actually includes multiple separate conductors carrying multiple different signals independently from one another. As described below, the conductive element of cable 409 may implement the functionality of conductors 228-1, 1228-1, 232, 1232, 285, 1285 discussed in FIGS. 2A and 2B.

Cable 409 is configured to communicate data 410 between PAM 402 and STU 408, and accordingly cable 409 performs the function of connectors 232, 1232 FIGS. 2A, 2B. Specifically, data 410 (e.g., instructions) generated by an RF heating system controller (e.g., RF heating system controller 212, 1212, FIGS. 2A, 2B) of PAM 402 is transmitted thorough cable 409 (and more specifically through the central conductor of cable 409) to a controller of a variable impedance matching circuit (e.g., controller 282, 1282 of variable impedance matching network 270, 1270, FIGS. 2A, 2B) of STU 408 for setting a configuration of the same. Conversely, data 412 generated or received by STU 408 or otherwise within containment structure 404 by sensors, such as power detection circuitry (e.g., detector 230, 1230, FIGS. 2A, 2B) or other sensors (e.g., sensors 294, 1294, FIGS. 2A, 2B), is transmitted back through cable 409 to a controller of PAM 402 (e.g., the RF heating system controller). Such data may indicate a temperature of a load or space within containment structure 404, a status of a component (e.g., a door or door latch) of containment structure 404, a magnitude of a reflected power measured within containment structure 404, or the like. The controller of PAM 402 can use the data to establish the instructions communicated as data to STU 408 to set the configuration of the variable impedance matching circuit or to otherwise control the delivery of RF energy from PAM 402 to STU 408 (e.g., by ending the delivery of RF energy when the controller determines the heating process is completed).

Cable 409 is also configured to carry the high power RF energy signal 414 outputted by the RF signal source (e.g., RF signal sources 220, 1220, FIGS. 2A, 2B) of PAM 402 to STU 408 (and, specifically, the impedance matching networks therein), which will, in turn and following impedance transformation, transmit the RF power 414 to electrode 406. Accordingly, cable 409 also performs the function of connectors 228-1, 1228-1, FIGS. 2A, 2B.

Additionally, in some embodiments, cable 409 may also carry a relatively low voltage (e.g., about 5 volts) DC signal 416 from PAM 402 to be outputted as DC signal 418 at STU 408. Accordingly, cable 409 also performs the function of connectors 285, 1285 FIGS. 2A, 2B. The DC signal 418 can be used to power components of STU 408 requiring such DC signal. For example, if the variable impedance matching network (e.g., variable impedance matching networks 270, 1270, FIGS. 2A, 2B) of STU 408 includes relays requiring a DC power supply, such relays may rely on the DC power signal 418 receive from PAM 402 via cable 409.

In this configuration, the data signals, high power RF signal, and DC voltages are modulated together as they are transmitted through cable 409 due to there being only a single cable connection between PAM 402 and STU 408. One received, the signals are demodulated and used accordingly.

To facilitate that modulation/demodulation process a number of filters may be incorporated into the system. Such filters may be utilized to control how the various signals being transmitted through cable 409 are distributed within PAM 402 and STU 408. Because the signals (e.g., data signals, RF signal, and DC signal) may all conduct signal energy at distinct frequencies (or within particular frequency bands), frequency-based filters (e.g., low-pass, high-pass, or band-pass filters) may be utilized to perform modulation and demodulation of the signals that are transmitted together through the single connecting cable 409, as described herein. Specifically, the filters may be used to modulate the data 410, RF power 414, and DC power 416 signals together in PAM 402 for transmission through cable 409 (and more specifically through the central conductor of cable 409) to STU 408. Similarly, upon receipt of the modulated signal, a similar set of filters may be utilized to separate the received signal into the data 412, RF power 414, and DC power 416 signals for use and processing by STU 408.

Figure 5:
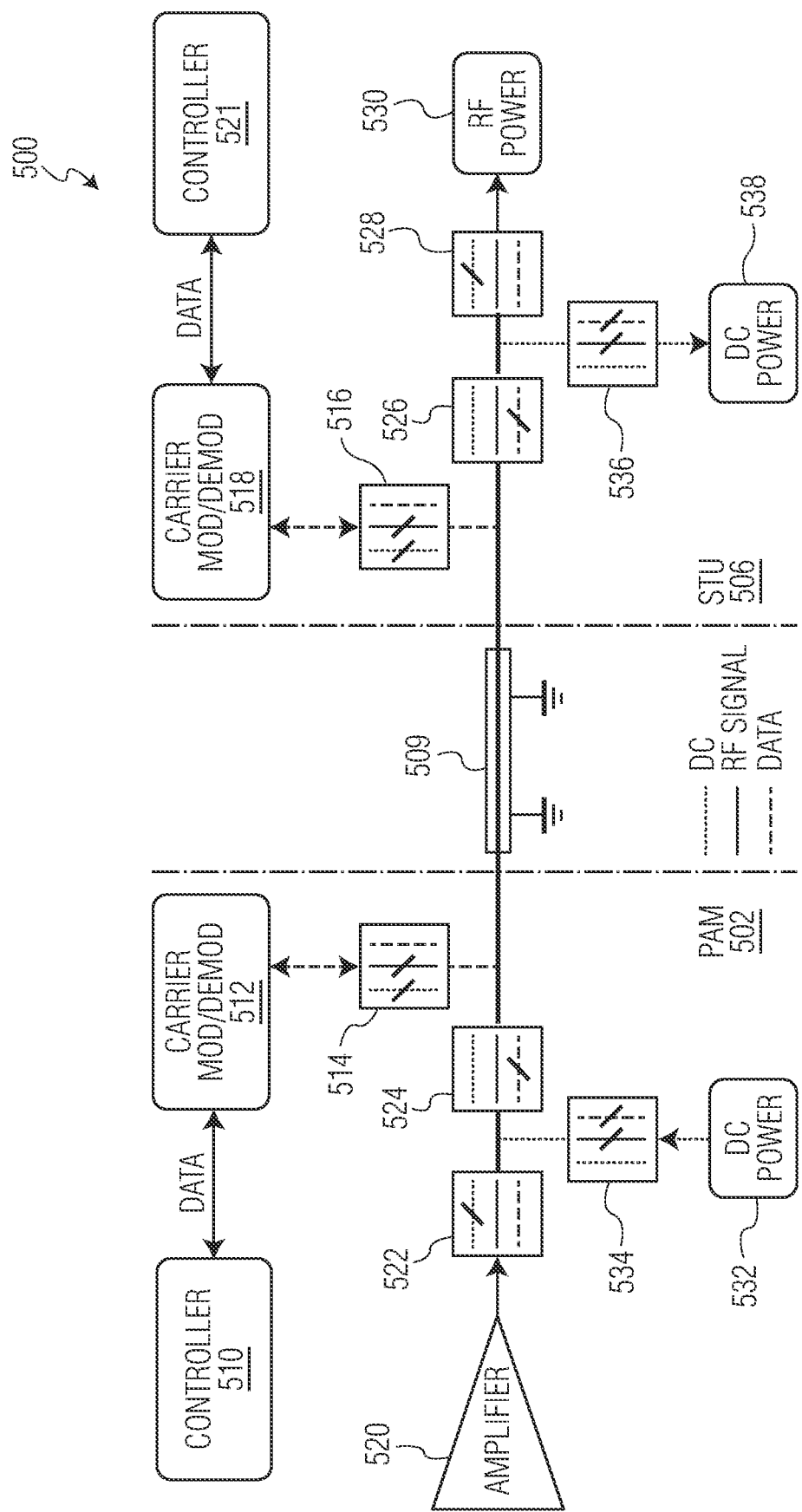
FIG. 5 is a simplified block diagram of an RF heating system in which a single cable connection is established between the system's PAM and STU, where the system includes filter components to enable modulation and demodulation of the signal transmitted through the single cable connection.

FIG. 5 is a simplified block diagram in which a single cable connection is established between a PAM and STU of an RF heating system, where the system includes filter components to enable modulation and demodulation of the signal transmitted through the cable connection.

RF heating system 500 includes PAM 502 (e.g., PAM 286, 1286, FIGS. 2A, 2B) and STU 508 (e.g., STU 288, 1288, FIGS. 2A, 2B). Cable 509 is connected between PAM 502 and STU 508. In embodiments, cable 509 is a 50 ohm transmission line and may be shielded so as to minimize emissions of RF energy traveling along cable 509. Cable 509 may be implemented with a single central conductor configured to implement the functionality of conductors 228-1, 1228-1, 232, 1232, 285, 1285 discussed in FIGS. 2A and 2B.

Cable 509 is configured to communicate data between PAM 402 and STU 408. Specifically, data (e.g., instructions) generated by an RF heating system controller 510 (e.g., RF heating system controller 212, 1212, FIGS. 2A, 2B) of PAM 402 are transmitted to carrier modulation module 512. Carrier modulation module 512 may be implemented as a discrete component incorporated into PAM 402 (e.g., PAM 286, 1286, FIGS. 2A, 2B) and is configured to modulate the data signals or instructions (e.g., encoded as a serial data signal) received from controller 510 with a suitable carrier signal (e.g., between and including 2.4 GHz carrier or 2.5 GHz carrier). In various embodiments, the carrier signal, therefore, may have a frequency ranging from 2 GHz to 3 GHz. The modulated signal encoding the instructions is then passed from carrier modulation module 512 through filter 514. Filter 514 is configured to allow the modulated high frequency signal received from carrier modulation module 512 to pass through filter 514. Conversely, filter 514 is configured to inhibit transmissions of DC voltage signals or RF signals from passing through filter 514. For example, when the carrier signal utilized by carrier modulation module 512 is about 2.45 GHz (i.e., significantly higher than the frequency of a DC signal—0 Hz, or typical frequencies of the high power RF signal—approximately 40 MHz), filter 514 may be configured to have a lower cutoff frequency that will inhibit transmissions of signals having frequencies below the carrier signal frequency (e.g., the cutoff frequency may be significantly below 2.4 GHz). As such, filter 514 may be configured as a high pass filter configured to permit signal energy at frequencies above the lower cutoff frequency (e.g., signal energy at frequencies greater than a lower cutoff frequency of about 650 MHz to 670 MHz up to 1 GHz or higher) to pass through filter 514, while inhibiting the transmission of signal energy at frequencies below the cutoff frequency through filter 514. The modulated data signal is passed from filter 514 to the first end of cable 509 for transmission to STU 506. The signal produced at the second end of cable 509 is then passed through filter 516 of STU 506, which is configured as a high pass filter and may have a similar configuration to filter 514. Filter 516 allows the high frequency portion of the signal (i.e., the signal energy conveying data instructions) received from cable 509 to pass through filter 516 to carrier modulation module 518. STU 506 includes a carrier modulation module 518 may be implemented as a discrete component incorporated into STU 506 (e.g., STU 288, 1288, FIGS. 2A, 2B) and is configured to demodulate the high-frequency signal received from filter 516 into the original instructions that were generated by controller 510 and encoded into the high frequency signal by carrier modulation module 512. The instructions are then transmitted to controller 521 (e.g., controller 282, 1282, FIGS. 2A, 2B), which may be configured to use the instructions, for example, to modify a configuration of a variable impedance matching network (e.g., variable impedance matching network 272, 1272, FIGS. 2A, 2B) incorporated into STU 506 (not shown in FIG. 5).

Similarly, data generated by controller 521 of STU 506 (e.g., from one or more temperature, door latch, or power detection sensor) can be transmitted to carrier modulation module 518 for modulating with a high frequency (e.g., 2.4 GHz) carrier signal. The modulated high frequency signal can then be transmitted through filter 516 (which is configured to enable the high frequency signal to pass through filter 516) to cable 509. After this signal is conveyed through cable 509, the high frequency signal, once received by PAM 502 passes through filter 514 and is demodulated by carrier modulation module 512. The demodulated sensor data is then passed to controller 510 for processing.

The amplifier 520 (e.g., RF signal source 220, 1220, FIG. 2A, 2B) of PAM 502 is configured to output a high power RF signal. The RF signal is passed through filters 522 and 524 to cable 509. Filter 522 is generally configured to block DC signals so that any DC signal energy generated by amplifier 520 is not passed through filter 522, and so that only the RF portion of the output of amplifier 520 is passed through filter 522. Filter 524 is configured as a low pass filter configured to block the high frequency signal generated by carrier modulation module 512, while allowing the RF signal output by amplifier 520 and DC signals to pass through. As the frequency of the RF signal outputted by amplifier 520 may range from about 1 MHz to 300 MHz, the upper cutoff frequency of low-pass filter 524 falls between the frequency of the RF signal outputted by amplifier 520 and the carrier signal of the high-frequency data signal generated by carrier modulation module 512. In some embodiments, therefore, the upper cutoff frequency of low-pass filter 524 may be in the range of 650 MHz to 670 MHz and up to 1-1.5 GHz.

The output of amplifier 520 (having passed through filters 522 and 524) is transmitted through cable 509 to filter 526. Filter 526 is configured in the same manner as filter 524 as a low pass filter configured to block the high frequency signal generated by carrier modulation modules 512 and 518, while allowing the RF signal generated by amplifier 520 and DC signals to pass through. The signal is outputted by filter 526 and passed to filter 528, which is configured in a similar manner as filter 522 to block DC signals so that only the RF signal is passed to the RF power output 530. The RF signal receive at RF power output 530 can then be transmitted through impedance matching networks (e.g., matching circuits 234, 270, 1234, 1270, FIGS. 2A, 2B) before being transmitted to an electrode of the RF heating system (e.g., electrodes 240, 242, 1240, 1242, FIGS. 2A, 2B).

PAM 502 may also include a DC power source 532 configured to generate a DC signal used to power one or more components in STU 506 (e.g., relays or other components in a variable matching network in STU 506 that may require a DC power source in order to operate). The DC signal (e.g., a 5 V DC signal) generated by DC power source 532 is transmitted to filter 534. Filter 534 is configured to block non-DC signals so that the DC signal outputted by DC power source 532 passes through filter 534, but other non-DC signals are blocked. The DC signal is then transmitted through cable 509 to filter 536. Filter 536 is configured in the same manner as filter 534 so that the DC signal passes through filter 536 and can be outputted to DC power output terminal 538. The DC signal at DC power output terminal 538 can be transmitted to the various components of STU 506 that require the DC signal for operation.

In this configuration, filters 514, 522, 524, and 534 ensure that only high-frequency (e.g., 2.4 GHz) signals generated by carrier modulation module 512, RF signals (e.g., having frequencies ranging from about 1 MHz-300 MHz) generated by amplifier 520, and DC signals generated by DC power source 532 are transmitted simultaneously (in this manner the signals are "combined) by cable 509. Because the various signals have disparate frequencies, the signals, one combined in cable 509 do not interfere with one another.

Within STU 506, filter 516 is configured so that the high frequency portion of the signal (i.e., the portion that includes the modulated high-frequency signal generated by carrier modulation module 512) is passed to carrier modulation module 518, while the DC and RF frequency portions of the signal are blocked. Similarly, filters 526 and 528 are configured so that only RF portion of the signal is passed to the RF power output 530, while the high-frequency portion of the signal is blocked (by filter 526) and the DC portion of the signal is blocked (by filter 528). Filter 536 is configured so that only the DC portion of the signal reaches DC power output terminal 538, while the RF and high frequency portions of the signal are blocked.

In this arrangement, the DC, RF and high-frequency signals are modulated together at an output of PAM 502 and transmitted, together, through the single connecting cable 509 (i.e., through a single conductor between the PAM and the STU). Within the STU 506, the filters 516, 526, 528, and 536 operate to separate the signal received from cable 509 into its constituent parts—the original DC, RF, and high-frequency signals for consumption by various components of STU 506.

Figure 6:
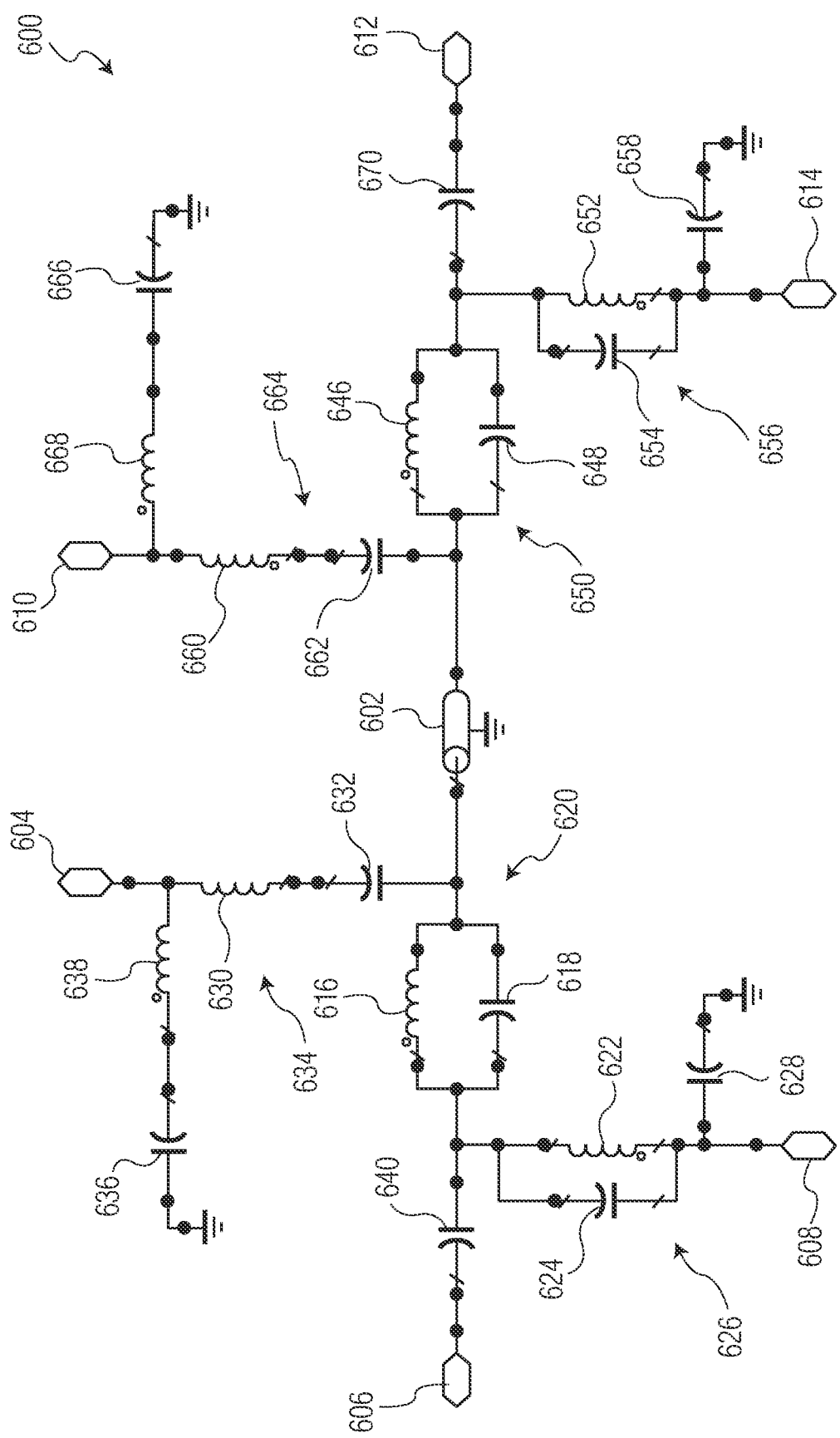
FIG. 6 is a schematic depicting a circuit implementing the various filters of FIG. 5 using discrete components, in accordance with an example embodiment.

FIG. 6 is a schematic depicting a circuit 600 implementing the various filters of FIG. 5. Circuit 600 includes a cable 602 (e.g., cable 509, 409, FIGS. 4, 5) configured to connect a PAM of a heating system to an STU of the heating system. A PAM controller (e.g., controller 510) is configured to transmit and receive high frequency (e.g., 2.4 GHz) data signals through contact pad 604. A power amplifier (e.g., amplifier 520, FIG. 5) is configured to supply an RF signal to contact pad 606. A DC power source (e.g., DC power source 532, FIG. 5) is configured to supply a DC voltage to contact pad 608.

Similarly, an STU controller (e.g., controller 521) is configured to transmit and receive high frequency (e.g., 2.4 GHz) data signals through contact pad 610. The circuit is configured to output the RF signal at contact pad 612. Contact pad 612 may be connected to one or more electrodes (e.g., electrodes 240, 242, 1240, 1242, 406, 306 FIGS. 2A, 2B, 3, 4) through impedance matching networks (e.g., networks 234, 270, 1234, 1270, FIGS. 2A, 2B). The circuit is configured to output the DC signal at contact pad 614. Contact pad 614 may be connected in turn to one or components in the STU requiring that DC voltage to operate.

Within circuit 600, inductor 616 and capacitor 618 are connected in parallel to form a filter that blocks the high frequency (e.g., 2.4 GHz) data signals generated by the PAM's controller, while allowing the RF signal and DC signal to pass through. The inductance of inductor 616 and capacitance of capacitor 618 are configured to that the components resonate at the frequency of the high frequency data signals, resulting in a filter 620 that has very high resistance or impedance to the high frequency signals, while allowing other signals to pass through. In an embodiment, the inductance of inductor 616 is 2.2 nano Henries (nH) and the capacitance of capacitor 618 is 2.0 pF, with minimal impedance at the RF signal frequency and to DC signals. As such, filter 620 is similar in operation to filter 524 of FIG. 5.

Inductor 622 and capacitor 624 are connected in parallel to form a filter 626 that blocks the RF signal (e.g., at 40.68 MHz), while allowing DC signals to pass through (i.e., received from contact pad 608). The inductance of inductor 622 and capacitance of capacitor 624 are configured so that the components resonate at the frequency of the RF signal, resulting in a filter 626 that has very high resistance to the RF signal, while allowing other signals to pass through. In an embodiment, the inductance of inductor 622 is 250 nH, with minimal impedance to DC signals. Filter 626 operates in conjunction with a shunt to ground capacitor 628, which in embodiments has a capacitance of approximately 10 microfarads. As such, filter 626 in combination with shunt capacitor 628 is similar in operation to filter 534 of FIG. 5.

Inductor 630 and capacitor 632 are connected in series and configured to resonate at the carrier frequency of the high frequency data signals (e.g., 2.4 GHz) generated by the system's controllers. In this configuration, the filter 634 created by inductor 630 and capacitor 632 are configured to pass the high frequency data signals to, or receive high frequency data signals from, contact pad 604 (which may be connected, in turn, to a controller of the PAM of a heating system), while blocking other signals such as the RF signal and DC signal. Filter 634 operates in combination with shunt to ground capacitor 636 and inductor 638 (which are series connected) to shunt to ground portions of any signal that passes through filter 634 which includes components of the RF signal. As such, filter 634 in combination with shunt capacitor 636 and shunt inductance 638 are similar in operation to filter 514 of FIG. 5.

Capacitor 640 is selected to further block transmissions of DC signals either to or from contact pad 606. In embodiments, capacitor 640 may have a capacitance of approximately 2 nanofarads.

Inductor 646 and capacitor 648 are connected in parallel to form a filter that blocks the high frequency (e.g., 2.4 GHz) data signals generated by the system's controller, while allowing the RF signal and DC signal to pass through. The inductance of inductor 646 and capacitance of capacitor 648 are configured to that the components resonate at the frequency of the high frequency data signals, resulting in a filter 650 that has very high resistance to the high frequency signals, while allowing other signals to pass through. In an embodiment, the inductance of inductor 646 is 2.2 nH and the capacitance of capacitor 648 is 2.0 pF, with minimal impedance at the RF signal frequency and to DC signals. As such, filter 650 is similar in operation to filter 526 of FIG. 5.

Inductor 652 and capacitor 654 are connected in parallel to form a filter 656 that blocks the RF signal (e.g., at 40.68 MHz), while allowing DC signals to pass through (i.e., received from contact pad 608). The inductance of inductor 652 and capacitance of capacitor 654 are configured to that the components resonate at the frequency of the RF signal, resulting in a filter 656 that has very high resistance to the RF signal, while allowing other signals to pass through. In an embodiment, the inductance of inductor 652 is 250 nH, with minimal impedance to DC signals. Filter 656 operates in conjunction with a shunt to ground capacitor 658, which in embodiments has a capacitance of approximately 10 microfarads. As such, filter 656 in combination with shunt capacitor 658 is similar in operation to filter 536 of FIG. 5.

Inductor 660 and capacitor 662 are connected in series and configured to resonate at the frequency of the high frequency data signals (e.g., 2.4 GHz) generated by the system's controllers. In this configuration, the filter 664 created by inductor 660 and capacitor 662 are configured to pass the high frequency data signals to or received high frequency data signals from contact pad 610 (which may be connected, in turn, to a system controller), while blocking other signals such as the RF signal and DC signal. Filter 664 operates in combination with shunt to ground capacitor 666 and inductor 668 (which are series connected) to shunt to ground portions of any signal that passes through filter 664 which includes components of the RF signal. As such, filter 664 in combination with shunt capacitor 666 and shunt inductance 668 are similar in operation to filter 516 of FIG. 5.

Capacitor 670 is selected to further block transmissions of DC signals either to or from contact pad 612. In embodiments, capacitor 670 may have a capacitance of approximately 2 nanofarads.

Although FIG. 6 depicts an example circuit for implementing the various filters of FIG. 5, it should be understood that the various filter networks may be implemented using different combinations of circuit components than shown in FIG. 6. Any filtering elements implemented using any combination of circuit components (active or passive) may be used to implement the filters depicted therein.

Figure 7:
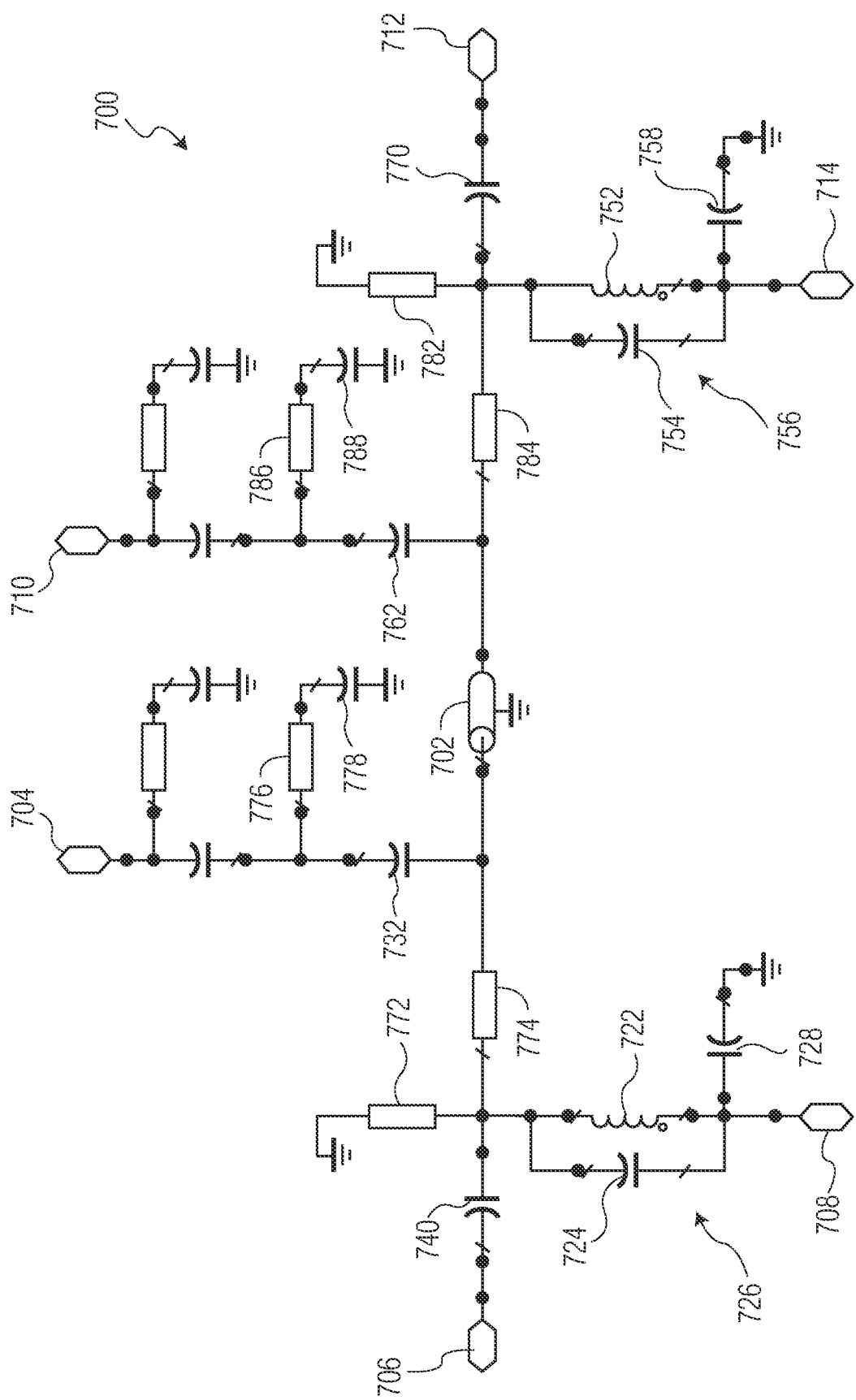
FIG. 7 is a schematic depicting a circuit implementing the various filters of FIG. 5 using transmission line segments, in accordance with an example embodiment.

As an illustration of an alternate filter configuration, FIG. 7 depicts an embodiment of the circuit 700 of FIG. 7 in which various components of the circuit are replaced with transmission line elements. Circuit 700 of FIG. 7 includes a cable 702 (e.g., cable 509, 409, FIGS. 4, 5) configured to connect a PAM of a heating system to an STU of the heating system. A PAM controller (e.g., controller 510) is configured to transmit and receive high frequency (e.g., 2.4 GHz) data signals through contact pad 704. A power amplifier (e.g., amplifier 520, FIG. 5) is configured to supply an RF signal to contact pad 706. A DC power source (e.g., DC power source 532, FIG. 5) is configured to supply a DC voltage to contact pad 708.

Similarly, an STU controller (e.g., controller 521) is configured to transmit and receive high frequency (e.g., 2.4 GHz) data signals through contact pad 710. The circuit is configured to output the RF signal at contact pad 712. Contact pad 712 may be connected to one or more electrodes (e.g., electrodes 240, 242, 1240, 1242, 406, 306 FIGS. 2A, 2B, 3, 4). The circuit is configured to output the DC signal at contact pad 714. Contact pad 714 may be connected in turn to one or components in the STU requiring that DC voltage to operate.

Within circuit 700, transmission line element 772 is a quarter-wave transmission line at frequencies equal to the high frequency data signals received from or transmitted to contact pad 704. Accordingly, for those high frequencies transmission line element 772 are shunted open preventing transmissions of those high frequency signals to either contact pad 706 or 708.

Transmission line element 774 is a quarter-wave transmission line at frequencies equal to the high frequency data signals and forms an open circuit to those signals further preventing them from being transmitted to either contact pad 706 or 708. In this manner, transmission line elements 772 and 774 provide similar functionality to filter 524 of FIG. 5

Capacitor 732 has a value (e.g., 2.2 pF) configured to block DC signals, while allowing the high frequency signal to pass. Transmission line element 776 is a quarter-wave line at frequencies equal to the high frequency data signals and operates in conjunction with capacitor 778 to operate as an open circuit to the high frequency data signals, but a short to ground for the RF signal. As such, the combination of capacitor 732, transmission line element 776 and capacitor 778 provide similar functionality to that of filter 514 of FIG. 5. A complimentary filter structure is formed by capacitor 734, transmission line 736, and capacitor 738 (which may each be similarly configured as capacitor 732, transmission line 776 and capacitor 778, respectively), which may further filter DC and RF signals from signals passing through capacitor 732.

Inductor 722 and capacitor 724 are connected in parallel to form a filter 726 that blocks the RF signal (e.g., at 40.68 MHz), while allowing DC signals to pass through (i.e., received from contact pad 708). The inductance of inductor 722 and capacitance of capacitor 724 are configured to that the components resonate at the frequency of the RF signal, resulting in a filter 726 that has very high resistance to the RF signal, while allowing other signals to pass through. In an embodiment, the inductance of inductor 722 is 250 nH, with minimal impedance to DC signals. Filter 726 operates in conjunction with a shunt to ground capacitor 728, which in embodiments has a capacitance of approximately 10 microfarads, to filter non-DC signals to ground. As such, filter 726 in combination with shunt capacitor 728 is similar in operation to filter 534 of FIG. 5.

Capacitor 740 is selected to further block transmissions of DC signals either to or from contact pad 706. In embodiments, capacitor 740 may have a capacitance of approximately 2 nanofarads.

Transmission line element 782 is a quarter-wave transmission line at frequencies equal to the high frequency data signals received from or transmitted to contact pad 710. Accordingly, for those high frequency transmission line element 782 is shunted open preventing transmissions of those high frequency signals to either contact pad 712 or 714.

Transmission line element 784 is a quarter-wave transmission line at frequencies equal to the high frequency data signals and forms an open circuit to those signals further preventing them from being transmitted to either contact pad 712 or 714. In this manner, transmission line elements 782 and 784 provide similar functionality to filter 524 of FIG. 5

Capacitor 762 has a value (e.g., 2.2 pF) configured to block DC signals, while allowing the high frequency signal to pass. Transmission line element 786 is a quarter-wave line at frequencies equal to the high frequency data signals and operates in conjunction with capacitor 788 to operate as an open circuit to the high frequency data signals, but a short to ground for the RF signal. As such, the combination of capacitor 762, transmission line element 786 and capacitor 788 provide similar functionality to that of filter 514 of FIG. 5. A complimentary filter structure is formed by capacitor 764, transmission line 766, and capacitor 768 (which may each be similarly configured as capacitor 732, transmission line 776 and capacitor 778, respectively), which may further filter DC and RF signals from signals passing through capacitor 732.

Inductor 752 and capacitor 754 are connected in parallel to form a filter 756 that blocks the RF signal (e.g., at 40.68 MHz), while allowing DC signals to pass through (i.e., received from contact pad 708). The inductance of inductor 752 and capacitance of capacitor 754 are configured to that the components resonate at the frequency of the RF signal, resulting in a filter 756 that has very high resistance to the RF signal, while allowing other signals to pass through. In an embodiment, the inductance of inductor 752 is 250 nH, with minimal impedance to DC signals. Filter 756 operates in conjunction with a shunt to ground capacitor 758, which in embodiments has a capacitance of approximately 10 microfarads, to filter non-DC signals to ground. As such, filter 756 in combination with shunt capacitor 758 is similar in operation to filter 534 of FIG. 5.

Capacitor 770 is selected to further block transmissions of DC signals either to or from contact pad 7126. In embodiments, capacitor 770 may have a capacitance of approximately 2 nanofarads.

Figure 8:
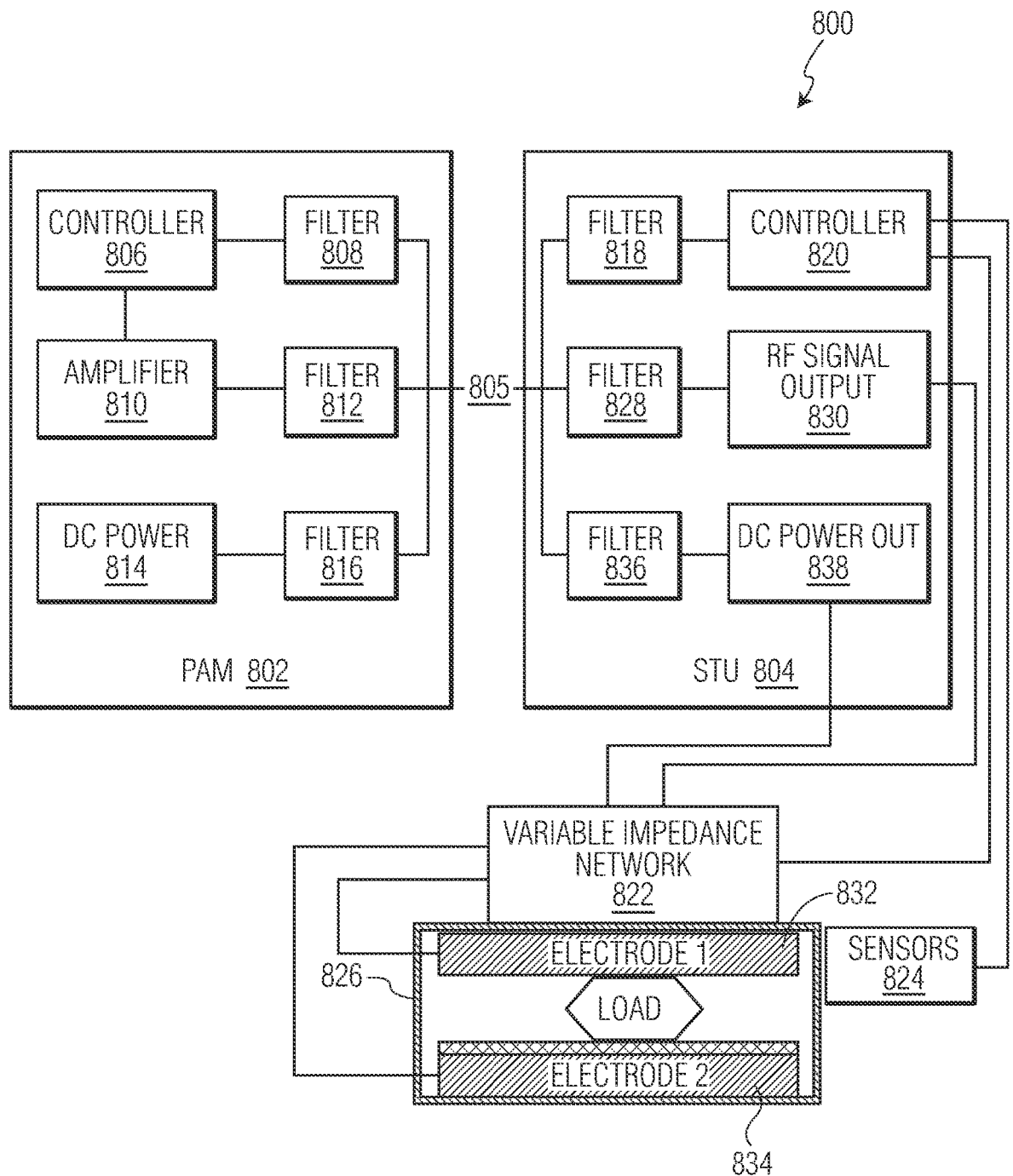
FIG. 8 is a simplified block diagram of an RF heating system including filter components connected between the system's PAM and STU, in accordance with an example embodiment.

FIG. 8 is a simplified block diagram of an RF heating system 800 including filter components connected between the system's PAM and STU, in accordance with an example embodiment.

System 800 includes PAM 802 (e.g., PAM 286, 1286, 302, 402, 502, FIGS. 2A, 2B, 3, 4, 5) that is coupled to STU 804 (e.g., STU 288, 1288, 308, 408, 506, FIGS. 2A, 2B, 3, 4, 5) by cable 805 (e.g., cable 409, 509, 602, 702, FIGS. 4, 5, 6, 7). PAM 802 includes a controller 806 (e.g., controller 212, 1212, 510, FIGS. 2A, 2B, 5) configured to modulate data and instructions with a high frequency carrier signal and output that high frequency data signal to filter 808 (e.g., filter 514, 634, 732, 776, 778, FIGS. 5, 6, 7). Filter 808 is configured to allow the high frequency data signal to pass through filter 808, while blocking other signals (e.g., RF or DC signals).

PAM 802 also includes an amplifier 810 (e.g., amplifier 220, 1220, 520, FIGS. 2A, 2B, 5) configured to output an RF signal to filter 812 (e.g., filters 522, 524, 640, 620, 740, 772, 774, FIGS. 5, 6, 7). Filter 812 is configured to allow the RF signal to pass through filter 812, while blocking other signals (e.g., high frequency data signal or DC signals).

Controller 806 is also configured to modulate the delivery of RF energy by amplifier 810. Controller 806 is typically configured to receive data inputs from controller 820 (through filters 818 and 808 and cable 805) indicative of a state of containment structure 826 and control an output of amplifier 810 based upon that data.

PAM 802 includes a DC power source 814 (e.g., DC power source 532, FIG. 5) configured to output a DC power signal to filter 816 (e.g., filters 534, 626, 726, FIGS. 5, 6, 7). Filter 816 is configured to allow the DC signal to pass through filter 816, while blocking other signals (e.g., high frequency data signal or the RF signal).

The signals that pass through each of filters 808, 812, 816 are combined and transmitted through cable 805 to STU 804. Specifically, filters 808, 812, 816 are directly coupled to a first end of cable 805 so that the signals that pass through each of filters 808, 812, and 816 are transmitted simultaneously through cable 805 and in that manner, the signals are combined during transmission through cable 805. In system implements in which cable 805 is removable or replaceable, filters 808, 812, and 816 may be configured to couple to the first end of cable 805 in a manner that allows cable 805 to be removed for replacement or servicing.

The signal transmitted through cable 805 is received by filter 818 (e.g., filter 516, 664, 762, 786, 788, FIGS. 5, 6, 7). Filter 818 is configured to allow the high frequency data signal portion of the signal received through cable 805 to pass through to STU controller 820 (e.g., controller 521, FIG. 5), while blocking other portions (e.g., the RF signal and DC signal) of the received signal. Controller 820 is configured to demodulate the high frequency data signal in order to retrieve the instructions that were encoded therein by controller 806. Controller 820 then uses through instructions to set the impedance transformation performed by variable impedance network 822 (e.g., impedance network 234, 270, 1234, 1270, FIGS. 2A, 2B).

System 800 includes sensors 824 (e.g., sensors/detectors 230, 294, 256, 1230, 1294, 1256, FIGS. 2A, 2B) configured to measure one or more attribute of the containment structure or components therein (e.g., air temperature, door latch status, reflected power, and the like). The output(s) of sensors 824 are transmitted to controller 820. Controller 820 can encode the measurement values received from sensors 824 into data and modulate that data with a high frequency carrier signal to generate a high frequency data signal. Controller 820 can then transmit that high frequency carrier signal through filter 818, cable 805, and filter 808 to controller 806. Controller 806 can demodulate the received high frequency data signal to retrieve the original data values that were generated by sensors 824. Controller 806 can then use that data to generate new instructions to be transmitted to controller 820 to configure a state of variable impedance network 822 or to control delivery of the RF signal by amplifier 810.

The signal transmitted through cable 805 by PAM 802 is also received by filter 828 (e.g., filter 526, 528, 650, 670, 784, 770, FIGS. 5, 6, 7). Filter 828 is configured to allow the RF signal portion of the signal received through cable 805 to pass through to RF signal output 830, while blocking the high frequency data signal and DC signal portions. RF signal output 830 is configured to transmit the received RF signal through variable impedance network 822 to one or both of electrodes 832, 834 in containment structure 826.

The signal transmitted through cable 805 by PAM 802 is also received by filter 836 (e.g., filter 536, 656, 756, FIGS. 5, 6, 7). Filter 836 is configured to allow the DC signal portion of the signal received through cable 805 to pass through to DC power output terminal 838, while blocking the high frequency data signal and RF signal portions. DC signal output terminal 838 is configured to transmit the received DC signal to components in variable impedance network 822 (or other components of system 800) requiring the DC signal to operate.

In this arrangement, filters 818, 828, 836 are directly coupled to a second end of cable 805. In system implements in which cable 805 is removable or replaceable, filters 818, 828, 836 may be configured to couple to the second end of cable 805 in a manner that allows cable 805 to be removed for replacement or servicing.

In FIG. 8, STU 804 is depicted as being outside containment structure 826, though it should be understood that in various embodiments, STU 804 and the components therein may be located within containment structure 826. In such a configuration, cable 805 passes through an opening in the containment structure to form the connections between PAM 802 and STU 804.

In embodiments, the frequencies of the high frequency data signal, the RF signal, and the DC signal do not overlap. For example, in a typical application, for example, the high frequency data signal may have a frequency of 2.4 GHz, though other high frequency signals (e.g., in the ISM band) may be utilized as long as the frequency used does not overlap the frequency of the system's RF signal, the RF signal may have a frequency ranging from 1 MHz to 300 MHz, and the DC signal has a frequency of 0 Hz. In general, embodiments may be configured so that the frequency of the high frequency data signal is separated from the frequency of the RF signal by at least 500 MHz. Because the signals have significantly different frequencies, filters 808, 818, 812, 828, 816, and 836 may be configured as high-pass, low-pass, or band-pass filters configured to allow the desired frequencies to pass through the filters, while blocking unwanted frequencies.

Filters 808 and 818, for example, may be configured as high-pass filters having cutoff frequencies less than the frequency of the high frequency data signal, but greater than the frequency of the RF signal. For example, when the frequency of the high frequency data signal is approximately 2.4 GHz and the frequency of the RF signal is 300 MHz or less, the cutoff frequency of filters 808, 818 may be from 500 MHz to 1.5 GHz, though different cutoff frequencies may be used in various embodiments.

Filters 812 and 828, for example, may be configured as band pass filters configured to pass signals have frequencies about the frequency of the RF signal, while blocking other frequencies. For example, when the frequency of the high frequency data signal is approximately 2.4 GHz and the frequency of the RF signal is about 40.68 MHz, the bandwidth passed by filters 812, 828 may include a range of frequencies from about 13 MHz (corresponding to a lower cutoff frequency) to about 120 MHz (corresponding to an upper cutoff frequency), though different bandwidths may be utilized in various embodiments. As would be apparent to a person of ordinary skill in the art, instead of implementing filters 812 and 828 as band pass filters, each filter may be implemented as a series-connected combination of a high-pass filter configured to block the high frequency data signal and a low-pass filter configured to block DC signals.

Filters 816 and 836, for example, may be configured as low-pass filters having cutoff frequencies less than the frequency of the RF signal, but greater than the frequency of the DC signal (i.e., 0 Hz). For example, when the frequency of the RF signal is greater than approximately 1 MHz, the cutoff frequency of filters 816, 836 may be about 700 Hz, though different cutoff frequencies may be used in various embodiments.

In an embodiment, a system includes a radio frequency (RF) signal source configured to output an RF signal having a first frequency, a first controller configured to generate a first data signal encoding instructions, wherein the first data signal is modulated with a carrier signal having a second frequency and the second frequency does not overlap the first frequency, and a first filter coupled to the RF signal source and configured to inhibit transmissions of the first data signal through the first filter and allow transmissions of the RF signal through the first filter. The first filter is configured to couple to a first end of a cable. The system includes a second filter coupled to the first controller and configured to inhibit transmissions of the RF signal through the second filter and allow transmissions of the first data signal through the second filter. The second filter is configured to couple to the first end of the cable. The system includes an impedance matching network configured to couple to a second end of the cable and a first electrode in a cavity configured to receive a load. The first electrode is coupled to an output of the impedance matching network and configured to radiate electromagnetic energy into the cavity as a result of receiving the RF signal.

In another embodiment, a system includes a radio frequency (RF) signal source configured to output an RF signal having a first frequency, a first controller configured to generate a first data signal encoding instructions, wherein the first data signal has a second frequency, and a first filter coupled to the RF signal source. The first filter is a low pass filter having a cutoff frequency between the first frequency and the second frequency. The first filter is configured to couple to a first end of a cable. The system includes a second filter coupled to the first controller. The second filter is a high pass filter having a cutoff frequency between the first frequency and the second frequency. The second filter is configured to couple to the first end of the cable. The system includes an impedance matching network including an input, the input of the impedance matching network being configured to couple to a second end of the cable, and a first electrode in a cavity configured to receive a load. The first electrode is coupled to an output of the impedance matching network.

In another embodiment, a method includes causing a radio frequency (RF) signal source to output an RF signal having a first frequency to a first end of a cable and causing a first controller to output a first data signal encoding instructions to the first end of the cable. The first data signal has a second frequency. A second end of the cable is connected to an input of an impedance matching network. A first electrode in a cavity configured to receive a load is coupled to an output of the impedance matching network.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
a radio frequency (RF) signal source configured to output an RF signal having a first frequency;
a first controller configured to generate a first data signal encoding instructions, wherein the first data signal is modulated with a carrier signal having a second frequency and the second frequency does not overlap the first frequency;
a first filter coupled to the RF signal source and configured to inhibit transmissions of the first data signal through the first filter and allow transmissions of the RF signal through the first filter, the first filter being configured to couple to a first end of a cable;
a second filter coupled to the first controller and configured to inhibit transmissions of the RF signal through the second filter and allow transmissions of the first data signal through the second filter, the second filter being configured to couple to the first end of the cable;
an impedance matching network configured to couple to a second end of the cable;
a third filter coupled between the second end of the cable and the impedance matching network, wherein the third filter is configured to inhibit transmissions of the first data signal through the third filter and allow transmissions of the RF signal through the third filter; and a first electrode in a cavity configured to receive a load, wherein the first electrode is coupled to an output of the impedance matching network and configured to radiate electromagnetic energy into the cavity as a result of receiving the RF signal.

2. The system of claim 1, further comprising a second controller coupled to the second end of the cable and configured to modify an impedance transformation performed by the impedance matching network based on the instructions.

3. The system of claim 2, further comprising a fourth filter coupled between the second end of the cable and the second controller, wherein the fourth filter is configured to inhibit transmissions of the RF signal through the fourth filter and allow transmissions of the first data signal through the fourth filter.

4. The system of claim 3, further comprising a detector configured to measure a magnitude of reflected power along a transmission path between the impedance matching network and the first electrode.

5. The system of claim 4, wherein the second controller is configured to encode the magnitude of the reflected power into a second data signal, wherein the second data signal is modulated with the carrier signal having the second frequency and the fourth filter is configured to allow transmissions of the second data signal to pass through the fourth filter.

6. The system of claim 1, wherein the second frequency of the carrier signal is between 2 gigahertz (GHz) and 3 GHz, and the second filter is a high pass filter having a cutoff frequency in a range between 500 MHz and 1.5 GHz.

7. The system of claim 1, wherein the first filter includes a low pass filter having a cutoff frequency of 700 hertz (Hz) or less.

8. The system of claim 1, wherein the cable is a shielded 50 ohm cable.

9. A system, comprising:
a radio frequency (RF) signal source configured to output an RF signal having a first frequency;
a first controller configured to generate a first data signal encoding instructions, wherein the first data signal is modulated with a carrier signal having a second frequency and the second frequency does not overlap the first frequency;
a first filter coupled to the RF signal source and configured to inhibit transmissions of the first data signal through the first filter and allow transmissions of the RF signal through the first filter, the first filter being configured to couple to a first end of a cable;
a second filter coupled to the first controller and configured to inhibit transmissions of the RF signal through the second filter and allow transmissions of the first data signal through the second filter, the second filter being configured to couple to the first end of the cable;
an impedance matching network configured to couple to a second end of the cable; and
a first electrode in a cavity configured to receive a load, wherein the first electrode is coupled to an output of the impedance matching network and configured to radiate electromagnetic energy into the cavity as a result of receiving the RF signal;
a direct current (DC) power source configured to output a DC signal; and
a fifth filter, wherein the fifth filter is coupled between the DC power source and the first end of the cable, and the fifth filter is configured to inhibit transmissions of the first data signal and the RF signal through the fifth filter and to allow transmissions of the DC signal to pass through the fifth filter.

10. The system of claim 9, wherein the impedance matching network includes a DC power output terminal configured to receive the DC signal, and the system further includes a sixth filter connected between the DC power output terminal and the second end of the cable, wherein the sixth filter is configured to inhibit transmissions of the first data signal and the RF signal through the sixth filter and allow transmissions of the DC signal to pass through the sixth filter.

11. A system, comprising:
a radio frequency (RF) signal source configured to output an RF signal having a first frequency;
a first controller configured to generate a first data signal encoding instructions, wherein the first data signal has a second frequency;
a first filter coupled to the RF signal source, wherein the first filter is a low pass filter having a cutoff frequency between the first frequency and the second frequency, the first filter being configured to couple to a first end of a cable;
a second filter coupled to the first controller, wherein the second filter is a high pass filter having a cutoff frequency between the first frequency and the second frequency, the second filter being configured to couple to the first end of the cable;
an impedance matching network including an input, the input of the impedance matching network being configured to couple to a second end of the cable; and
a first electrode in a cavity configured to receive a load, wherein the first electrode is coupled to an output of the impedance matching network;
a second controller coupled to the second end of the cable and configured to modify an impedance transformation performed by the impedance matching network based on the instructions; and
a fourth filter coupled between the second end of the cable and the second controller, wherein the fourth filter is a high pass filter having a cutoff frequency between the first frequency and the second frequency.

12. The system of claim 11, further comprising a third filter coupled between the second end of the cable and the impedance matching network, wherein the third filter is a low pass filter having a cutoff frequency between the first frequency and the second frequency.

13. The system of claim 11, further comprising a direct current (DC) power source configured to output a DC signal and a fifth filter, wherein the fifth filter is coupled between the DC power source and the first end of the cable and the fifth filter is a low pass filter having a cutoff frequency less than the first frequency.

14. The system of claim 13, wherein the impedance matching network includes a DC power output terminal configured to receive the DC signal, and wherein the system further includes a sixth filter connected between the DC power output terminal and the second end of the cable, wherein the sixth filter is a low pass filter having a cutoff frequency less than the first frequency.

15. The system of claim 11, wherein the cable is a shielded 50 ohm cable.

* * * * *